(12) United States Patent
Li et al.

(10) Patent No.: US 10,996,666 B2
(45) Date of Patent: May 4, 2021

(54) UNMANNED AERIAL VEHICLE CONTROL METHOD AND APPARATUS

(71) Applicant: Tencent Technology (Shenzhen) Company Limited, Shenzhen (CN)

(72) Inventors: Jialun Li, Shenzhen (CN); Kaifeng Li, Shenzhen (CN); Xiangxin Zhang, Shenzhen (CN); Jia Wei, Shenzhen (CN); Qiuli Huang, Shenzhen (CN); Linghong Li, Shenzhen (CN); Zhiqiang Yu, Shenzhen (CN); Dongsheng Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 310 days.

(21) Appl. No.: 15/993,350

(22) Filed: May 30, 2018

(65) Prior Publication Data
US 2018/0275647 A1 Sep. 27, 2018

Related U.S. Application Data

(63) Continuation-in-part of application No. PCT/CN2017/082138, filed on Apr. 27, 2017.

(30) Foreign Application Priority Data

Apr. 27, 2016 (CN) .......................... 201610270755.2

(51) Int. Cl.
*G05D 1/00* (2006.01)
*G06F 3/0484* (2013.01)
(Continued)

(52) U.S. Cl.
CPC ......... *G05D 1/0016* (2013.01); *B64C 39/024* (2013.01); *G01C 21/22* (2013.01);
(Continued)

(58) Field of Classification Search
CPC ............ G06F 3/04883; G06F 3/04845; G06F 3/04817; G06F 3/0486; G06F 2203/04808; G06F 1/266; G06F 3/04842
See application file for complete search history.

(56) References Cited

U.S. PATENT DOCUMENTS 7,130,741 B2 10/2006 Bodin et al.
8,140,257 B2 * 3/2012 Villaume ............. G05D 1/0083
701/467
(Continued)

FOREIGN PATENT DOCUMENTS

CN 101750090 A 6/2010
CN 102566580 A 7/2012
(Continued)

OTHER PUBLICATIONS

Tencent Technology, ISR, PCT/CN2017/082138, dated Aug. 3, 2017, 3 pgs.
(Continued)

*Primary Examiner* — Redhwan K Mawari
(74) *Attorney, Agent, or Firm* — Morgan, Lewis & Bockius LLP

(57) ABSTRACT

The presently disclosed technology discloses an unmanned aerial vehicle control method and apparatus. A device displays a map. The device detects a first movement path on a touch-sensitive surface of the device. The device overlays a trajectory on the map in accordance with the first movement path. The device automatically generates a number of waypoints along the trajectory. and the device displays the waypoints on the trajectory and sends instructions to an unmanned vehicle in accordance with the trajectory and the waypoints. The unmanned vehicle moves in accordance with trajectory by executing the instructions.

20 Claims, 11 Drawing Sheets

(51) Int. Cl.
*G08G 5/00* (2006.01)
*G01C 21/22* (2006.01)
*B64C 39/02* (2006.01)
*G06F 3/0488* (2013.01)

(52) U.S. Cl.
CPC ....... *G05D 1/0044* (2013.01); *G06F 3/04845* (2013.01); *G06F 3/04883* (2013.01); *G08G 5/0021* (2013.01); *G08G 5/0026* (2013.01); *G08G 5/0034* (2013.01); *G08G 5/0069* (2013.01); *B64C 2201/146* (2013.01)

(56) References Cited

U.S. PATENT DOCUMENTS

| | | | | |
|---|---|---|---|---|
| 2011/0098917 | A1* | 4/2011 | LeBeau | G06F 1/329 701/533 |
| 2011/0251920 | A1* | 10/2011 | Watson | G01C 21/206 705/26.9 |
| 2012/0316782 | A1* | 12/2012 | Sartipi | G09B 29/106 701/455 |
| 2015/0094127 | A1* | 4/2015 | Canose | G06F 3/04842 463/2 |
| 2016/0068267 | A1* | 3/2016 | Liu | G05D 1/0061 701/11 |
| 2016/0078770 | A1* | 3/2016 | Coulmeau | G06F 3/04845 701/3 |
| 2017/0003795 | A1* | 1/2017 | Lee | G06F 3/04883 |
| 2017/0203763 | A1* | 7/2017 | Yamada | B60W 10/18 |
| 2017/0225691 | A1* | 8/2017 | Yamada | B60K 31/00 |
| 2017/0276497 | A1* | 9/2017 | Andrew | G01C 21/3641 |
| 2018/0224298 | A1* | 8/2018 | Jeong | G01C 21/3664 |
| 2018/0275647 | A1* | 9/2018 | Li | G06F 3/04845 |

FOREIGN PATENT DOCUMENTS

| | | |
|---|---|---|
| CN | 103443587 A | 12/2013 |
| CN | 103562680 A | 2/2014 |
| CN | 103941748 A | 7/2014 |
| CN | 104035446 A | 9/2014 |
| CN | 105955290 A | 9/2016 |

OTHER PUBLICATIONS

Tencent Technology, Written Opinion, PCT/CN2017/082138, dated Aug. 3, 2017, 7 pgs.

Tencent Technology, IPRP, PCT/CN2017/082138, Oct. 30, 2018, 8 pgs.

* cited by examiner

UNMANNED AERIAL VEHICLE CONTROL METHOD AND APPARATUS

RELATED APPLICATIONS

This application is a continuation-in-part of PCT Application No. PCT/CN2017/082138, entitled "UNMANNED AERIAL VEHICLE CONTROL METHOD AND APPARATUS", filed Apr. 27, 2017, which claims priority to Chinese Patent Application No. 201610270755.2, entitled "UNMANNED AERIAL VEHICLE CONTROL METHOD AND APPARATUS" filed with the Chinese Patent Office on Apr. 27, 2016, both of which are incorporated by reference in their entirety.

FIELD OF THE TECHNOLOGY

The presently disclosed technology relates to the field of computers, and specifically, to an unmanned aerial vehicle control method and apparatus.

BACKGROUND OF THE DISCLOSURE

Currently, a commonly used technical means of controlling an unmanned aerial vehicle is manually setting a flight track for the unmanned aerial vehicle by a user, that is, a waypoint location across which the unmanned aerial vehicle needs to fly is set by manually inputting. Not only is the operation of manually setting location information of waypoint locations one by one complex for the user, but also a setting time period is relatively long when the flight track is relatively long. This greatly prolongs a flight track generation time period of the unmanned aerial vehicle, leading to reduced control efficiency due to that the unmanned aerial vehicle fails to obtain a flight track in time.

SUMMARY

According to one aspect of embodiments of the presently disclosed technology, a method is performed at a device having one or more processors, memory, a display generation component, and a touch-sensitive input surface. The device displays a map using the display generation component. While displaying the map, the device detects a first touch input on the touch-sensitive surface. The first touch input includes first movement of a first contact to form a first movement path on the touch-sensitive surface. In response to detecting the first movement of the first contact to form the first movement path, the device overlays a trajectory on the map in accordance with the first movement path. The device automatically generates a number of waypoints along the trajectory. The device displays representations of the waypoints on the trajectory. The device sends instructions to an unmanned vehicle in accordance with the trajectory and the waypoints, such that the unmanned vehicle moves in accordance with trajectory by executing the instructions.

According to another aspect of the embodiments of the presently disclosed technology, a device includes one or more processors, memory, and a plurality of instructions stored in the memory that, when executed by the one or more processors, cause the device to perform the aforementioned method.

According to a third aspect of the present disclosure, a non-transitory computer readable storage medium storing a plurality of instructions configured for execution by a computer server having one or more processors, the plurality of instructions causing the computer server to perform the aforementioned method.

In the embodiments of the presently disclosed technology, a trajectory drawn on a map displayed on a client is identified, a plurality of discrete points is selected on the trajectory, coordinates of waypoints are generated according to coordinates of the plurality of discrete points on the map, and the coordinates of the waypoints are sent to an unmanned aerial vehicle, so that the unmanned aerial vehicle flies according to the coordinates of the waypoints. In other words, a client identifies a trajectory drawn on a displayed map and selects a plurality of discrete points on the trajectory, so that coordinates of waypoints are automatically generated by using coordinates of the plurality of discrete points on the map, and an unmanned aerial vehicle flies according to the automatically generated coordinates of the waypoints. In this way, coordinates of all waypoints do not need to be manually set, thereby simplifying a control operation performed on the flight of the unmanned aerial vehicle and improving the efficiency of controlling the unmanned aerial vehicle.

In addition, by identifying a drawn trajectory, and generating waypoints according to a plurality of discrete points selected on the trajectory, a process of automatically generating coordinates of the waypoints may further be simplified, thereby reducing a waypoint generation time period and improving the waypoint generation efficiency.

BRIEF DESCRIPTION OF THE DRAWINGS

The accompanying drawings described herein are used to provide a further understanding of the presently disclosed technology, and form part of the presently disclosed technology. Exemplary embodiments of the presently disclosed technology and descriptions thereof are used to explain the presently disclosed technology, and do not constitute any inappropriate limitation to the presently disclosed technology. In the accompanying drawings.

DESCRIPTION OF EMBODIMENTS

To make a person in the art understand the solutions in the presently disclosed technology better, the following clearly and completely describes the technical solutions in the embodiments of the presently disclosed technology with reference to the accompanying drawings in the embodiments of the presently disclosed technology. Apparently, the described embodiments are merely some but not all of the embodiments of the presently disclosed technology. All other embodiments obtained by a person of ordinary skill in the art based on the embodiments of the presently disclosed technology without creative efforts shall fall within the protection scope of the presently disclosed technology.

It should be noted that, in the specification, claims, and accompanying drawings of this application, the terms "first", "second", and the like are intended to distinguish between similar objects rather than describe a specific order or sequence. It should be understood that the data termed in such a way are interchangeable in proper circumstances, so that the embodiments of the presently disclosed technology described herein can be implemented in orders except the orders illustrated or described herein. Moreover, the terms "include", "contain" and any other variants mean to cover the non-exclusive inclusion. For example, a process, method, system, product, or device that includes a list of steps or units is not necessarily limited to those steps or units expressly listed, but may include other steps or units not expressly listed or inherent to such a process, method, product, or device.

Figure 1:
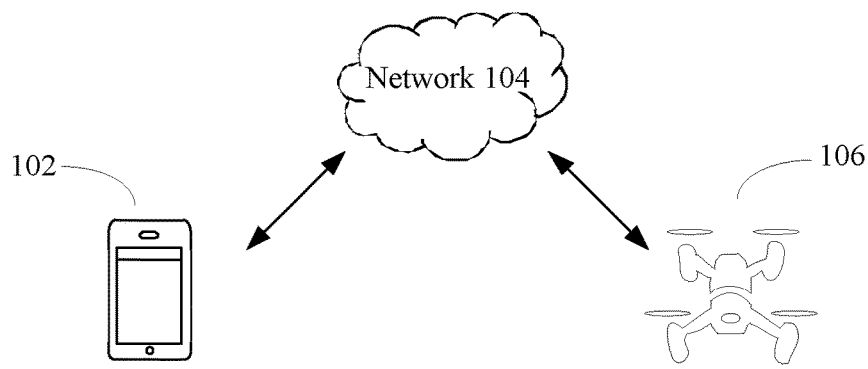
FIG. 1 is a schematic diagram of an application environment of an unmanned aerial vehicle control method according to an embodiment of the presently disclosed technology.

According to an embodiment of the presently disclosed technology, an unmanned aerial vehicle control method is provided. The unmanned aerial vehicle control method may be applied to but is not limited to an application environment shown in FIG. 1. A client running in a terminal 102 is configured to control the flight of an unmanned aerial vehicle 106 by using a network 104. That is, a trajectory drawn on a map displayed on the client is identified, a plurality of discrete points is selected on the trajectory, coordinates of waypoints are generated according to coordinates of the plurality of discrete points on the map, and the coordinates of the waypoints are sent to the unmanned aerial vehicle, so that the unmanned aerial vehicle flies according to the coordinates of the waypoints. In other words, the client identifies a trajectory drawn on a displayed map and selects a plurality of discrete points on the trajectory, so that coordinates of waypoints are automatically generated by using coordinates of the plurality of discrete points on the map, and the unmanned aerial vehicle flies according to the automatically generated coordinates of the waypoints. In this way, coordinates of all waypoints do not need to be manually set, thereby improving the efficiency of controlling the unmanned aerial vehicle.

Optionally, in this embodiment, the foregoing terminal may include but is not limited to at least one of the following: a mobile phone, a tablet computer, a notebook computer, a desktop PC, or a control handle. The foregoing is merely exemplary, and no limitation is set in this embodiment. Optionally, in this embodiment, the network 104 between the terminal 102 and the unmanned aerial vehicle may include but is not limited to at least one of the following: a wide area network, a metropolitan area network, or a local area network. The foregoing is merely exemplary, and no limitation is set in this embodiment. In addition, the foregoing terminal may further control the unmanned aerial vehicle by but is not limited to by using a wireless network. The foregoing wireless network may include but is not limited to at least one of the following: a wireless Bluetooth or a wireless WiFi. The foregoing is merely exemplary, and no limitation is set in this embodiment.

Figure 2:
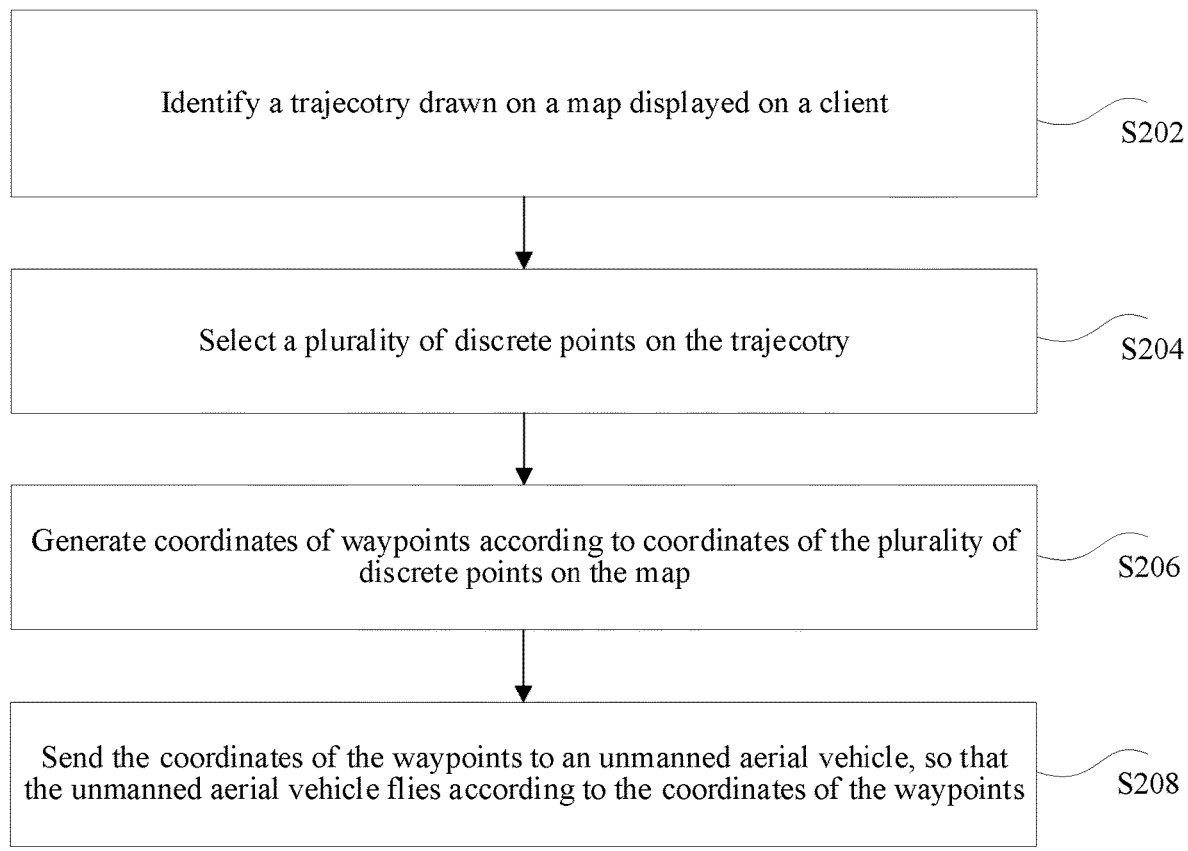
FIG. 2 is a flowchart of an unmanned aerial vehicle control method according to an embodiment of the presently disclosed technology the presently disclosed technology.

According to an embodiment of the presently disclosed technology, an unmanned aerial vehicle control method is provided. As shown in FIG. 2, the method includes:

S202: Identify a trajectory drawn on a map displayed on a client.

S204: Select a plurality of discrete points on the trajectory.

S206: Generate coordinates of waypoints according to coordinates of the plurality of discrete points on the map.

S208: Send the coordinates of the waypoints to an unmanned aerial vehicle, so that the unmanned aerial vehicle flies according to the coordinates of the waypoints.

Optionally, in this embodiment, the foregoing unmanned aerial vehicle control method may be applied to but is not limited to a client running in a terminal. The client is configured to control the flight of an unmanned aerial vehicle. The foregoing unmanned aerial vehicle may include but is not limited to at least one of the following: an unmanned airplane, an unmanned aircraft, an unmanned airship, an unmanned balloon, or the like. In some aspects, the disclosed method can be applied to unmanned vehicles that do not take flight in air, but move underwater, or inside sub-terrain space (e.g., in underground caves, in mud, or in lava, etc.).

Figure 3:
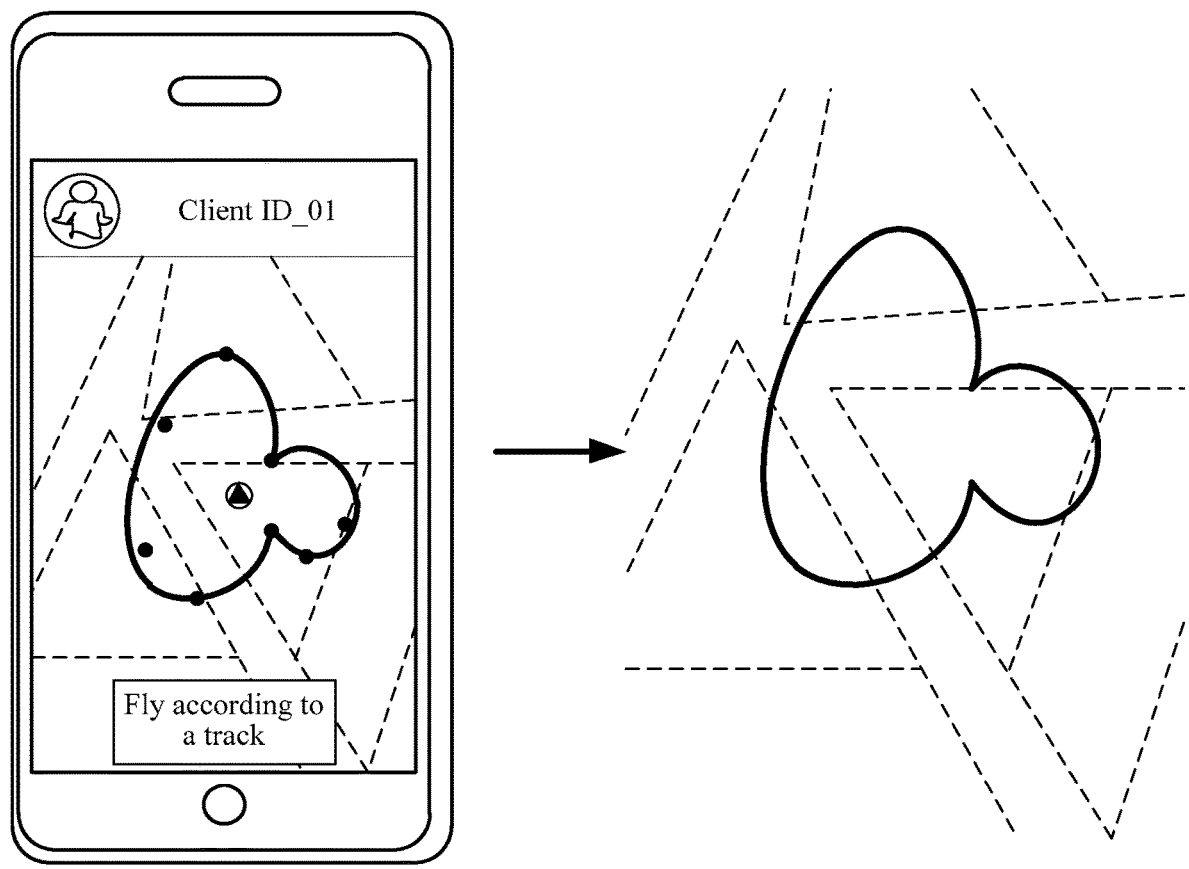
FIG. 3 is a schematic diagram of an unmanned aerial vehicle control method according to an embodiment of the presently disclosed technology.

For example, a map is displayed on a client ID_01 on a terminal interface shown in the left part of FIG. 3. A solid triangle is used as an origin of coordinates on the map. A trajectory drawn on the map, that is, a thick solid line on the terminal interface shown in the left part of FIG. 3 is identified. A plurality of discrete points is selected on the trajectory, that is, solid dots on the thick solid line shown in the left part of FIG. 3 are selected. Then, coordinates of waypoints are selected according to coordinates of the plurality of discrete points on the map. After an instruction of "flying according to a track" is received, the terminal sends the coordinates of the waypoints to an unmanned aerial vehicle, so that the unmanned aerial vehicle flies according to the coordinates of the waypoints, for example, flies according to a track of the thick solid line shown in the right part of FIG. 3. The coordinates of the waypoints required during the flight of the unmanned aerial vehicle are automatically generated by using the coordinates that are on the map and that are of the plurality of discrete points selected on the drawn trajectory, so that a control operation performed on the flight of the unmanned aerial vehicle is simplified and the efficiency of controlling the flight of the unmanned aerial vehicle is improved. The foregoing is merely exemplary, and no limitation is set in this embodiment.

It should be noted that, in this embodiment, a trajectory drawn on a map displayed on the client is identified, a plurality of discrete points is selected on the trajectory, coordinates of waypoints are generated according to coordinates of the plurality of discrete points on the map, and the coordinates of the waypoints are sent to the unmanned aerial vehicle, so that the unmanned aerial vehicle flies according to the coordinates of the waypoints. In other words, the client identifies a trajectory drawn on a displayed map and selects a plurality of discrete points on the trajectory, so that coordinates of waypoints are automatically generated by using coordinates of the plurality of discrete points on the map, and the unmanned aerial vehicle flies according to the automatically generated coordinates of the waypoints. In this way, coordinates of all waypoints do not need to be manually set, thereby simplifying a control operation performed on the flight of the unmanned aerial vehicle and improving the efficiency of controlling the unmanned aerial vehicle. In addition, by identifying a drawn trajectory, and generating waypoints according to a plurality of discrete points selected on the trajectory, a process of automatically generating coordinates of the waypoints may further be simplified, thereby reducing a waypoint generation time period and improving the waypoint generation efficiency.

Optionally, in this embodiment, the foregoing operation of drawing the trajectory may be implemented in but is not limited to at least one of the following manners: drawing by using a touchscreen or drawing by using an external input device. For example, the external input device may be an electronic stylus.

Figure 4:
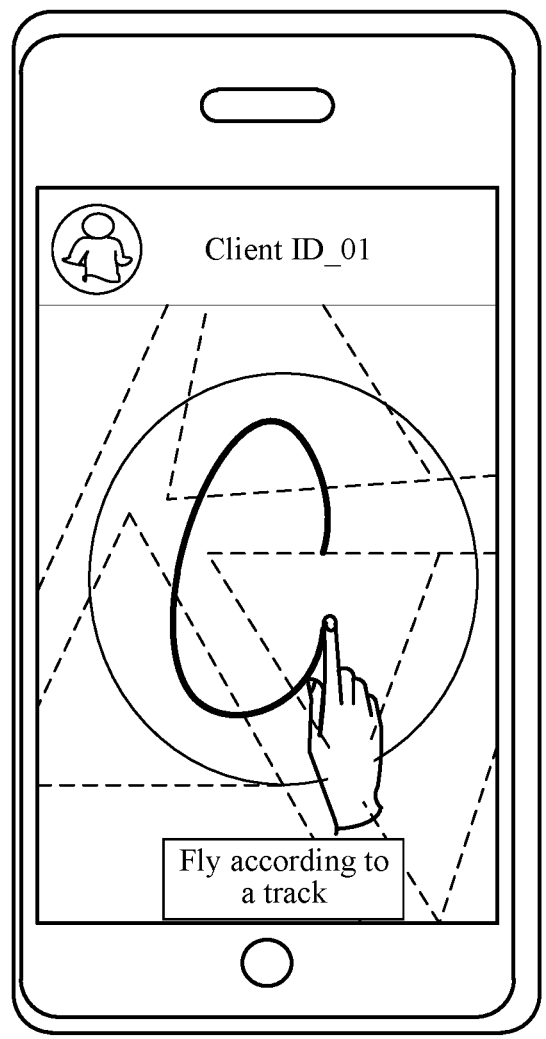
FIG. 4 is a schematic diagram of another unmanned aerial vehicle control method according to an embodiment of the presently disclosed technology.

Optionally, in this embodiment, the trajectory drawn on the displayed map may be of any shape, for example, may be a trajectory formed by a thick solid line shown in FIG. 4. The foregoing is merely exemplary, and no limitation is set in this embodiment.

Optionally, in this embodiment, the selecting a plurality of discrete points on the trajectory includes: obtaining a start point and an end point of the trajectory; and selecting N discrete points between the start point and the end point of the trajectory, the plurality of discrete points including: the start point, the N discrete points, and the end point; each two neighboring discrete points of the plurality of discrete points forming a line segment, an angle formed by each two neighboring line segments being less than a predetermined threshold, and N≥1.

Figure 5:
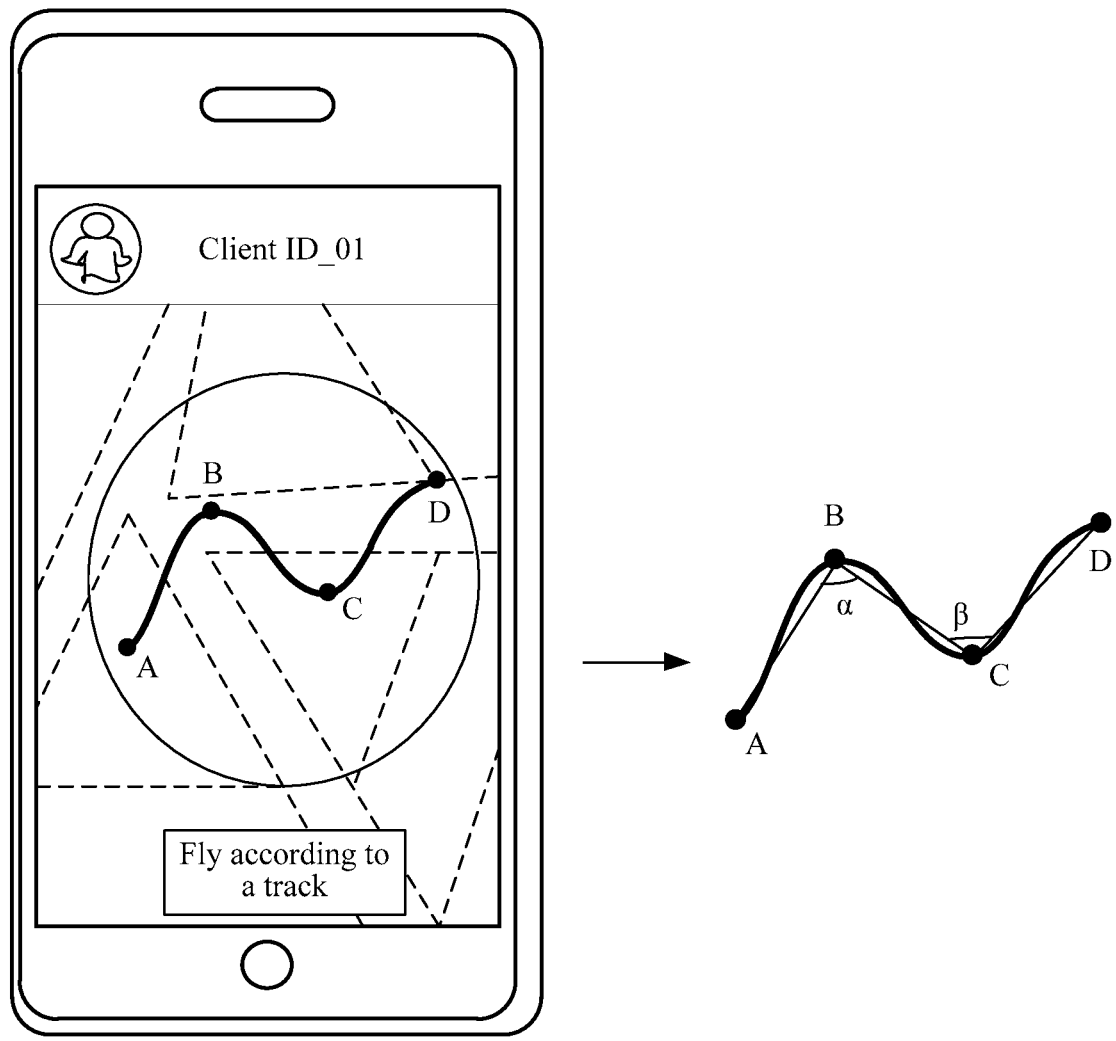
FIG. 5 is a schematic diagram of still another unmanned aerial vehicle control method according to an embodiment of the presently disclosed technology.

That is, in this embodiment, the foregoing trajectory at least includes a start point and an end point. Further, N discrete points are then selected between the start point and the end point. N≥1. In this way, the plurality of discrete points on the trajectory for generating the waypoints is obtained. Each two neighboring discrete points of the plurality of discrete points form a line segment, and an angle formed by each two neighboring line segments is less than a first predetermined threshold. For example, the drawn trajectory is shown in FIG. 5. A start point A and an end point D on the trajectory are obtained. Further, another two discrete points, that is, a discrete point B and a discrete point C between the start point A and the end point D are obtained. Both an angle α formed by the discrete points A, B, and C and an angle β formed by the discrete points B, C, and D are less than the predetermined threshold. In other words, in this embodiment, a discrete point corresponding to a sharper angle on the trajectory is more likely to be selected as one of the N discrete points, to ensure that a waypoint is generated at each important inflection point on the trajectory, so that when the unmanned aerial vehicle flies according to the coordinates of the waypoints, the track indicated by the trajectory can be accurately re-presented. In some embodiments, the start point and end point of the trajectory are specified in ways other than the touch input that draws the trajectory. For example, the start and end point may be two user specified addresses, or the unmanned vehicles' current location or default location. In some embodiments, the trajectory that is drawn by the user may be slightly offset from the start and end point already specified by the other methods, and the device uses the existing start and end points as the anchor points to shift the trajectory (e.g., translate the trajectory without changing the shape, or adding the start and end point to the trajectory in accordance with a best fit method).

Optionally, in this embodiment, the selecting a plurality of discrete points on the trajectory includes: obtaining a start point and an end point of the trajectory; and selecting N discrete points between the start point and the end point of the trajectory, the plurality of discrete points including: the start point, the N discrete points, and the end point; each two neighboring discrete points of the plurality of discrete points forming a vector, an angle formed by each two neighboring vectors being greater than a predetermined threshold, and N≥1.

It should be noted that, in another optional manner, the terminal may determine, by but is not limited to by obtaining an angle between vectors formed by the discrete points, whether a waypoint is generated. The foregoing is merely exemplary. For a process of selecting a discrete point, refer to the foregoing example, and details are not described in this embodiment again.

Optionally, in this embodiment, the foregoing map may obtain different display scales, that is, map scales by but is not limited to by performing a scaling operation. In this embodiment, the coordinates of the waypoints of the unmanned aerial vehicle may be determined according to but is not limited to a current display scale of the map.

Optionally, in this embodiment, the generating coordinates of waypoints according to coordinates of the plurality of discrete points on the map may include but is not limited to at least one of the following:

1) converting the coordinates of the discrete points on the map to the coordinates of the waypoints according to a current display scale of the map; or 2) setting the coordinates of the discrete points on the map as the coordinates of the waypoints.

It should be noted that, in this embodiment, in an optional implementation, the coordinates of the discrete points on the map may be converted to the coordinates of the waypoints according to the current display scale of the map. The coordinate conversion may be performed according to but is not limited to different coordinate systems. For example, an absolute coordinate system is established by using a center of the map (or a vertex of the map) as an origin, and the coordinates of the discrete points on the map are converted, to obtain the coordinates of the waypoints. For another example, a relative coordinate system is established by using the start point of the trajectory as an origin, and the coordinates of the discrete points on the map and relative to the start point are converted, to obtain the coordinates of the waypoints. By converting the coordinates of the discrete points to actual coordinates, the unmanned aerial vehicle is accurately controlled, to ensure that the unmanned aerial vehicle can fly according to the drawn trajectory.

In addition, in another optional implementation, the coordinates of the discrete points on the map may alternatively be set as the coordinates of the waypoints. For example, the coordinates, such as GPS coordinates of the discrete points on the map may be directly set as the coordinates of the waypoints. For another example, a map having a display scale corresponding to the display scale of the map displayed on the client is stored in the unmanned aerial vehicle, and the coordinates of the discrete points on the map are directly used as the coordinates of the waypoints and sent to the unmanned aerial vehicle. In this way, the unmanned aerial vehicle can fly, with no coordinate conversion being performed, according to a corresponding trajectory, thereby simplifying an operation of controlling the flight of the unmanned aerial vehicle.

Figure 6:
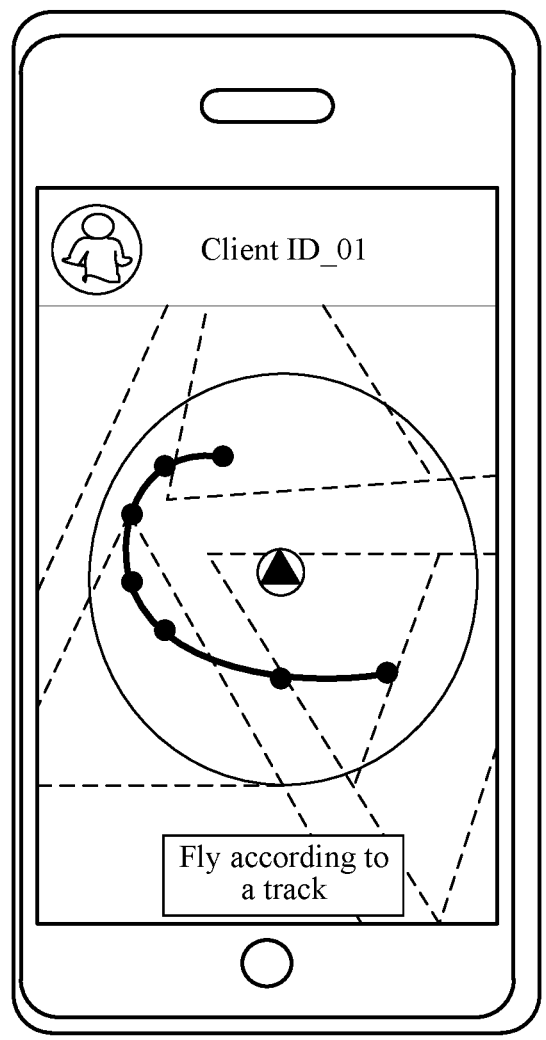
FIG. 6 is a schematic diagram of still another unmanned aerial vehicle control method according to an embodiment of the presently disclosed technology.

Optionally, in this embodiment, after the generating coordinates of waypoints according to coordinates of the plurality of discrete points on the map, the method further includes: displaying the waypoints on the map according to the coordinates of the waypoints. For example, as shown in FIG. 6, a map is displayed on a client ID_01. A solid triangle is used as an origin (0, 0) of coordinates on the map. After the coordinates of the waypoints are generated by using the coordinates of the plurality of discrete points on the map, the waypoints, such as solid dots on a thick solid line shown in FIG. 6 are displayed on the map.

Optionally, in this embodiment, after the displaying the waypoints on the map according to the coordinates of the waypoints, the method further includes:

1) obtaining a first adjustment instruction, and adjusting a flight parameter of the unmanned aerial vehicle at each waypoint in response to the first adjustment instruction, the flight parameter at least including a flight height or a flight speed; or 2) obtaining a second adjustment instruction, and adjusting the coordinates of the waypoints in response to the second adjustment instruction; or 3) obtaining a third adjustment instruction, and adjusting, in response to the third adjustment instruction, a quantity of the waypoints displayed on the map.

It should be noted that, in this embodiment, the quantity of the waypoints may be adjusted in but is not limited to at least one of the following manners: inputting a quantity to be adjusted to, adjusting a progress bar, directly deleting or adding waypoints, adjusting the trajectory, or adjusting the first predetermined threshold used for comparing with the angles between the line segments formed by the discrete points.

Optionally, in this embodiment, when being controlled to fly according to the coordinates of the waypoints, the unmanned aerial vehicle may perform a predetermined flying action at a predetermined waypoint. The foregoing flying action may be but is not limited to a user-defined action. For example, by setting a flight parameter, the unmanned aerial vehicle performs an action of spirally rising at the predetermined waypoint, or flies according to a predetermined figure in a three-dimensional space near the waypoint, for example, flies according to a square track with the waypoint being a center.

Optionally, in this embodiment, that the client sends the coordinates of the waypoints to the unmanned aerial vehicle includes: 1) sending coordinates of all waypoints to the unmanned aerial vehicle, so that the unmanned aerial vehicle performs coordinate positioning by using a GPS, thereby controlling the flight of the unmanned aerial vehicle; 2) performing synchronous control by using the client, to sequentially send the coordinates of the waypoints to the unmanned aerial vehicle, so that the unmanned aerial vehicle is controlled, by using the client, to perform synchronous flying.

According to this embodiment of the presently disclosed technology, the client identifies a trajectory drawn on a displayed map and selects a plurality of discrete points on the trajectory, so that coordinates of waypoints are automatically generated by using coordinates of the plurality of discrete points on the map, and the unmanned aerial vehicle flies according to the automatically generated coordinates of the waypoints. In this way, coordinates of all waypoints do not need to be manually set, thereby simplifying a control operation performed on the flight of the unmanned aerial vehicle and improving the efficiency of controlling the unmanned aerial vehicle. In addition, by identifying a drawn trajectory, and generating waypoints according to a plurality of discrete points selected on the trajectory, a process of automatically generating coordinates of the waypoints may further be simplified, thereby reducing a waypoint generation time period and improving the waypoint generation efficiency.

In an implementation, the selecting a plurality of discrete points on the trajectory includes:

S1: Obtain a start point and an end point of the trajectory.

S2: Select N discrete points between the start point and the end point of the trajectory, the plurality of discrete points including: the start point, the N discrete points, and the end point; each two neighboring discrete points of the plurality of discrete points forming a line segment, an angle formed by each two neighboring line segments being less than a first predetermined threshold, and N≥1.

The selecting N discrete points between the start point and the end point of the trajectory may include but is not limited to: determining an angle of each pair of line segments formed by a plurality of track points identified on the trajectory, to select N discrete points from the plurality of track points.

Details are described with reference to the example shown in FIG. 5. It is assumed that the drawn trajectory is shown on a terminal interface in the left part of FIG. 5. The first predetermined threshold is 120 degrees. As shown in the right part of FIG. 5, a start point A and an end point D on the trajectory are obtained. Further, another two discrete points, that is, a discrete point B and a discrete point C between the start point A and the end point D are obtained. An angle α formed by the discrete points A, B, and C is 60 degrees and an angle β formed by the discrete points B, C, and D is 80 degrees, and both angles are less than the predetermined threshold 120 degrees after comparison. That is, when the trajectory is shown in FIG. 5, the selected discrete points are the discrete points A, B, C, and D, as shown in FIG. 5.

In the foregoing implementation, a plurality of discrete points on the trajectory including the start point of the trajectory, the selected N discrete points and the end point of the trajectory is obtained. Each two neighboring discrete points of the plurality of discrete points form a line segment, and an angle formed by each two neighboring line segments is less than a predetermined threshold. That is, in the foregoing implementation, a discrete point corresponding to a sharp angle on the trajectory is selected as one of the N discrete points, to ensure that a waypoint is generated at each important inflection point on the trajectory, so that when the unmanned aerial vehicle flies according to the coordinates of the waypoints, the track indicated by the trajectory can be accurately re-presented.

In an implementation, the identifying a trajectory drawn on a map displayed on a client includes: identifying a plurality of track points on the trajectory, the plurality of track points including the start point and the end point.

The selecting N discrete points between the start point and the end point of the trajectory includes: determining whether an angle formed by a first line segment and a second line segment is less than a second predetermined threshold, the first line segment being a line segment formed by a first track point and a middle track point of three neighboring track points of the plurality of track points, the second line segment being a line segment formed by the middle track point and a second track point of the three neighboring track points; and when the angle formed by the first line segment and the second line segment is less than the second predetermined threshold, selecting the middle track point as one of the N discrete points.

In a process of identifying the trajectory drawn on the map, a plurality of track points is identified on the trajectory. The plurality of track points may include a start point and an end point. By determining an angle of each pair of line segments formed by the plurality of track points, N discrete points are selected from the plurality of track points. For example, the foregoing track points may be but are not limited to identified pixels. The foregoing is merely exemplary, and no limitation is set in this embodiment.

Figure 7:
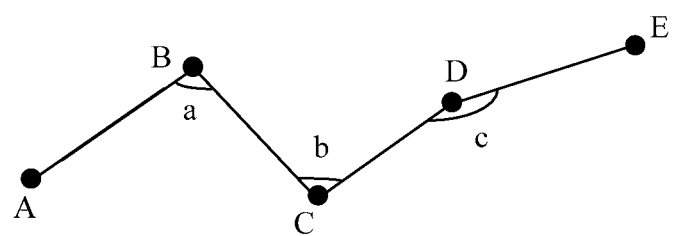
FIG. 7 is a schematic diagram of still another unmanned aerial vehicle control method according to an embodiment of the presently disclosed technology.

Details are described with reference to the following example. It is assumed that the second predetermined threshold is 120 degrees, and five track points having a location relationship shown in FIG. 7 are identified on the trajectory, that is, a track point A used as a start point, a track point E used as an end point, and a track point B, a track point C, and a track point D located between the start point A and the end point E. The track point A, the track point B, and the track point C are three neighboring track points; the track point B, the track point C, and the track point D are three neighboring track points; the track point C, the track point D, and the track point E are three neighboring track points. Two line segments, that is, a line segment AB and a line segment BC are formed by the track point A, the track point B, and the track point C, and an angle a between the line segment AB and the line segment BC is 100 degrees; two line segments, that is, a line segment BC and a line segment CD are formed by the track point B, the track point C, and the track point D, and an angle b between the line segment BC and the line segment CD is 90 degrees; two line segments, that is, a line segment CD and a line segment DE are formed by the track point C, the track point D, and the track point E, and an angle c between the line segment CD and the line segment DE is 150 degrees.

Further, it is determined whether the angle formed by each two line segments is less than the second predetermined threshold 120 degrees. FIG. 7 is used as an example for description. The 100 degrees corresponding to the angle a between the line segment AB and the line segment BC is less than the second predetermined threshold 120 degrees; the 90 degrees corresponding to the angle b between the line segment BC and the line segment CD is less than the second predetermined threshold 120 degrees; the 150 degrees corresponding to the angle c between the line segment CD and the line segment DE is greater than the second predetermined threshold 120 degrees. That is, when the track points shown in FIG. 7 are identified on the trajectory, middle track points, that is, the track point B and the track point C of the angle a and the angle b whose degrees are less than the second predetermined threshold 120 degrees may be selected as discrete points of the N discrete points. Then, the track point B and the track point C, and the track point A used as the start point and the track point E used as the end point are finally selected as the discrete points on the trajectory.

In the foregoing implementation, the plurality of track points is identified on the trajectory first, and it is determined whether the angle between the first line segment and the second line segment formed by three neighboring track points is less than the second predetermined threshold, to determine whether to select one of the N discrete points that is between the start point and the end point on the trajectory. That is, the discrete points used for generating the waypoints are directly selected by using the location relationship between the identified track points on the trajectory. In this way, the process of automatically generating the coordinates of the waypoints is simplified, and the waypoint generation efficiency is improved.

In an implementation, the generating coordinates of waypoints according to coordinates of the plurality of discrete points on the map includes one of the following:

1) converting the coordinates of the discrete points on the map to the coordinates of the waypoints according to a current display scale of the map.

The coordinates of the discrete points on the map may be converted to the coordinates of the waypoints according to the current display scale of the map. The coordinate conversion may be performed according to but is not limited to different coordinate systems.

Figure 8:
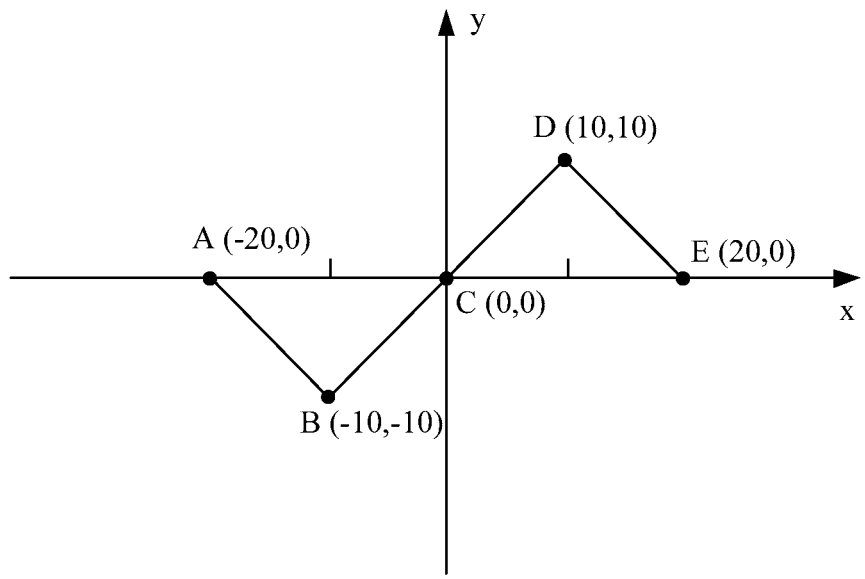
FIG. 8 is a schematic diagram of still another unmanned aerial vehicle control method according to an embodiment of the presently disclosed technology.

For example, as shown in FIG. 8, an absolute coordinate system is established by using a center of the map (or a vertex of the map, which is merely exemplary herein) as an origin (0, 0), and the coordinates of the selected discrete points, such as a discrete point A to a discrete point E in FIG. 8 on the map are converted according to the current display scale of the map, to obtain the coordinates of the waypoints.

Figure 9:
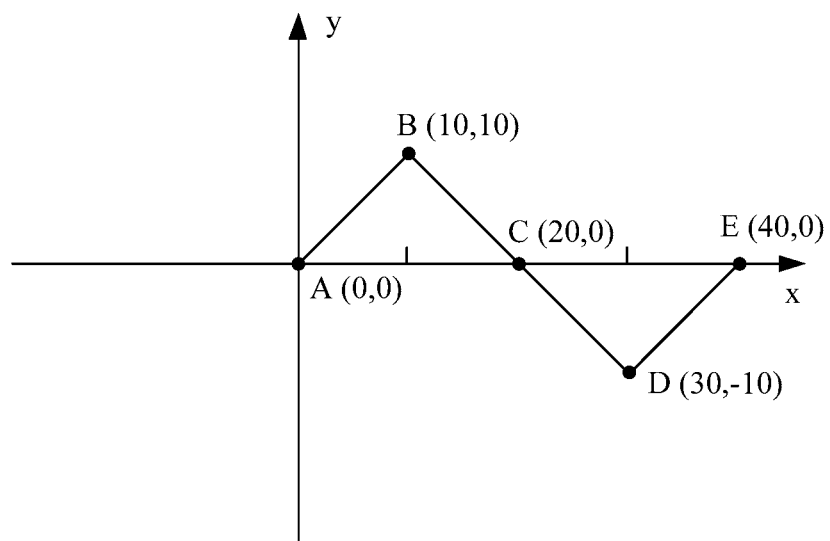
FIG. 9 is a schematic diagram of still another unmanned aerial vehicle control method according to an embodiment of the presently disclosed technology.

For another example, as shown in FIG. 9, a relative coordinate system is established by using a start point A of the trajectory as an origin (0, 0), and coordinates of discrete points A to E on the map and relative to the start point A are converted according to the current display scale of the map, to obtain the coordinates of the waypoints.

That is, by converting the coordinates of the discrete points on the map to the coordinates of the waypoints according to the current display scale of the map, the unmanned aerial vehicle is accurately controlled, to ensure that the unmanned aerial vehicle can fly according to the drawn trajectory.

2) setting the coordinates of the discrete points on the map as the coordinates of the waypoints.

The coordinates of the discrete points on the map may be directly set as the coordinates of the waypoints.

Figure 10:
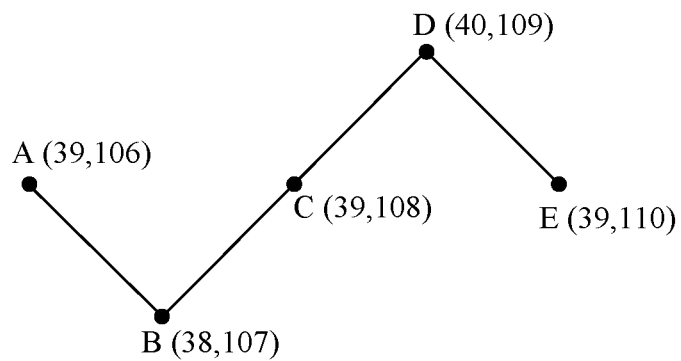
FIG. 10 is a schematic diagram of still another unmanned aerial vehicle control method according to an embodiment of the presently disclosed technology.

For example, when the coordinates of the discrete points on the map are GPS coordinates shown in FIG. 10, the GPS coordinates of the discrete points on the map, such as latitude/longitude coordinates may be directly set as the coordinates of the waypoints.

For another example, a map having a display scale corresponding to the display scale of the map displayed on the client is stored in the unmanned aerial vehicle, and the coordinates of the discrete points on the map are directly used as the coordinates of the waypoints.

That is, the coordinates of the discrete points on the map are directly used as the coordinates of the waypoints and sent to the unmanned aerial vehicle. In this way, the unmanned aerial vehicle can fly, with no coordinate conversion being performed, according to a corresponding trajectory, thereby simplifying an operation of controlling the flight of the unmanned aerial vehicle.

Figure 11:
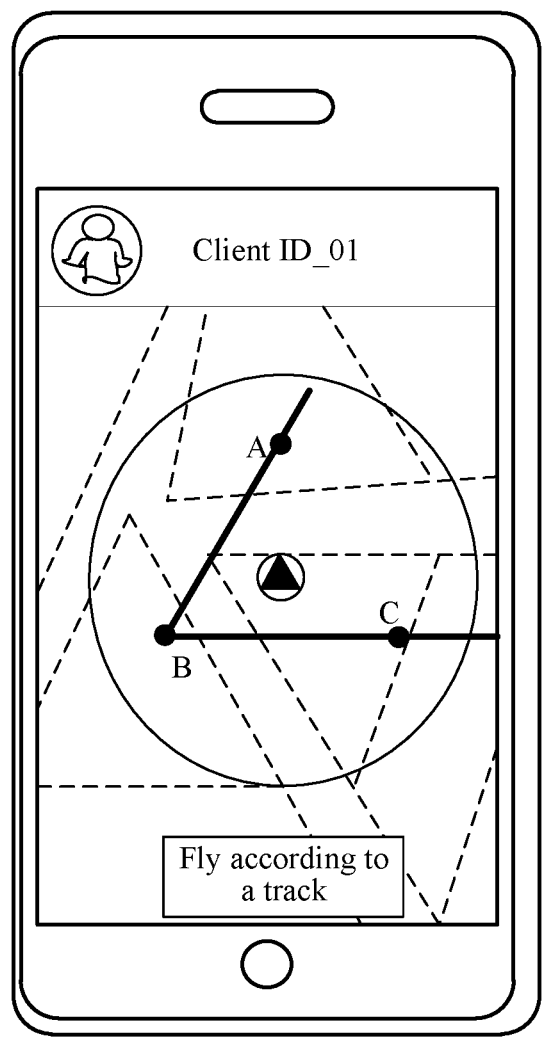
FIG. 11 is a schematic diagram of still another unmanned aerial vehicle control method according to an embodiment of the presently disclosed technology.

Details are described with reference to the following example. It is assumed that three discrete points, that is, a discrete point A, a discrete point B, and a discrete point C are selected on the trajectory. A relationship among locations of the three discrete points is shown in FIG. 11. A solid triangle is an origin (0, 0) of coordinates. A coordinate of each of the three discrete points is correspondingly A (0, 62), B (−54, −18), and C (56, −14). Further, assuming that the display scale of the map displayed on the foregoing client ID_01 is the same as the display scale of the map stored in the unmanned aerial vehicle, the coordinates of the discrete points on the map, that is, the A (0, 62), B (−54, −18), and C (56, −14) are directly used as the coordinates of the waypoints and sent to the unmanned aerial vehicle.

In the foregoing implementation, the coordinates of the discrete points on the map are converted to the coordinates of the waypoints according to the current display scale of the map, or the coordinates of the discrete points on the map are set as the coordinates of the waypoints. In the foregoing two manners, the coordinates of the waypoints are automatically generated by using the coordinates of the discrete points on the map, so that the accuracy of the generated coordinates of the waypoints is ensured, and the drawn trajectory can be accurately re-presented when the unmanned aerial vehicle flies according to the coordinates of the waypoints.

In an implementation, after the generating coordinates of waypoints according to coordinates of the plurality of discrete points on the map, the method further includes:

displaying the waypoints on the map according to the coordinates of the waypoints.

For example, as shown in FIG. 6, a map is displayed on a client ID_01. A solid triangle is used as an origin (0, 0) of coordinates on the map. After the coordinates of the waypoints are generated by using the coordinates of the plurality of discrete points on the map, the waypoints, such as solid dots on a thick solid line shown in FIG. 6 are displayed on the map.

After the waypoints are displayed on the trajectory drawn on the map, an operation includes but is not limited to an editing and adjusting operation may be performed on the generated waypoints. The editing and adjusting operation may include but is not limited to at least one of the following: adjusting a flight parameter at each waypoint, adjusting the coordinates of the waypoints, adjusting a quantity of the waypoints, or setting a user-defined action at a predetermined waypoint.

In the foregoing implementation, by displaying the waypoints on the map, not only can the waypoints across which the unmanned aerial vehicle will fly be directly seen, but also an editing operation may be directly performed on the displayed waypoints, so that the unmanned aerial vehicle can be synchronous controlled in real time.

In an implementation, after the displaying the waypoints on the map according to the coordinates of the waypoints, the method further includes at least one of the following:

1) obtaining a first adjustment instruction, and adjusting a flight parameter of the unmanned aerial vehicle at each waypoint in response to the first adjustment instruction, the flight parameter at least including a flight height or a flight speed.

For example, when the client detects that a height at which a waypoint A is located is adjusted, for example, adjusted from 10 meters to 6 meters, the first adjustment instruction is generated in response to the operation, to instruct the unmanned aerial vehicle to adjust the flight height from the current 10 meters to 6 meters. After receiving the first adjustment instruction, the unmanned aerial vehicle performs a corresponding adjustment to reduce the flight height.

2) obtaining a second adjustment instruction, and adjusting the coordinates of the waypoints in response to the second adjustment instruction.

For example, when the client detects that a location at which of a waypoint A is located is adjusted, for example, translated 10 meters eastward from a current location, the second adjustment instruction is generated in response to the operation, to instruct the unmanned aerial vehicle to translate 10 meters eastward from the current location. After receiving the second adjustment instruction, the unmanned aerial vehicle performs a corresponding adjustment to translate 10 meters eastward.

3) obtaining a third adjustment instruction, and adjusting, in response to the third adjustment instruction, a quantity of the waypoints displayed on the map.

For example, when the client detects that the quantity of the waypoints is reduced, for example, a waypoint B is deleted, the third adjustment instruction is generated in response to the operation, to instruct the unmanned aerial vehicle to delete the waypoint B. After receiving the third adjustment instruction, the unmanned aerial vehicle performs a corresponding adjustment to avoid flying across the waypoint B.

Figure 12:
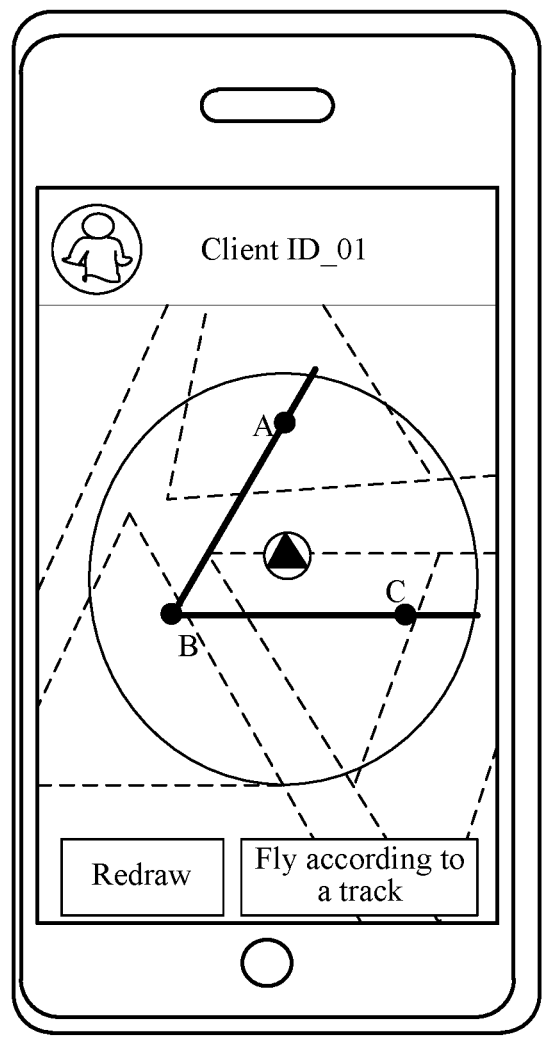
FIG. 12 is a schematic diagram of still another unmanned aerial vehicle control method according to an embodiment of the presently disclosed technology.

After the drawn trajectory is obtained, the drawn trajectory may be canceled. For example, a "redraw" button shown in FIG. 12 is clicked on to update the drawn trajectory.

In the foregoing implementation, after the waypoints are displayed on the map, different editing and adjusting operations may be performed on the waypoints displayed on the map.

In an implementation, the obtaining a third adjustment instruction includes at least one of the following:

1) when it is detected that the client receives an input first quantity of the waypoints, generating the third adjustment instruction according to the first quantity, the third adjustment instruction being used for instructing to adjust the quantity of the waypoints displayed on the map to the first quantity.

Figure 13:
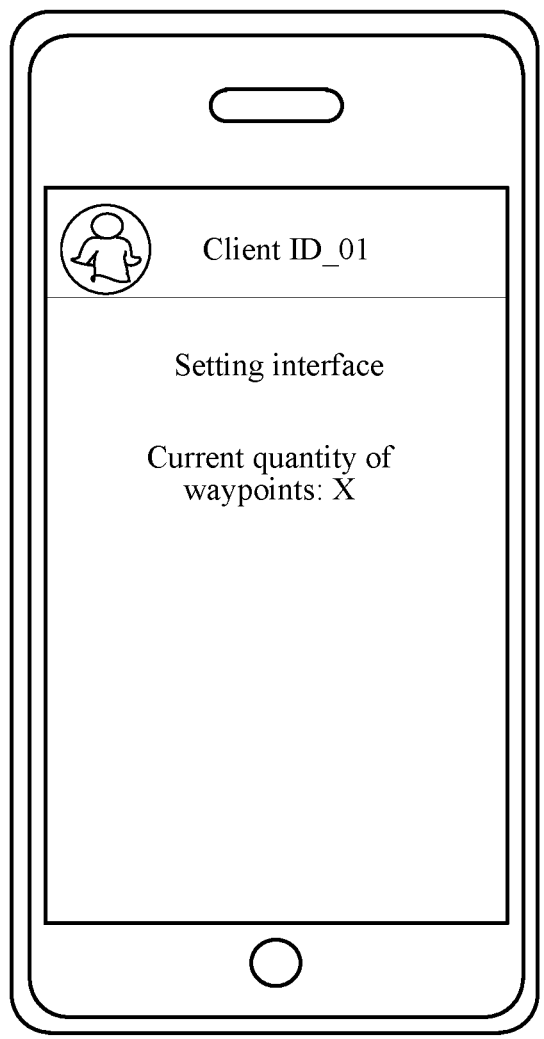
FIG. 13 is a schematic diagram of still another unmanned aerial vehicle control method according to an embodiment of the presently disclosed technology.

For example, as shown in FIG. 13, when it is detected that the current quantity of the waypoints input by using a setting interface of the client, for example, the first quantity is X, the quantity of the waypoints displayed on the map is adjusted to the first quantity X. For another example, a quantity increasing button may be set on the map, to directly input the first quantity of the waypoints. This embodiment is not limited to the foregoing two manners.

It should be noted that, the adjusting the quantity of the waypoints may include but is not limited to: selecting first X track points of a smallest angle formed by a first line segment and a second line segment as waypoints.

2) when it is detected that a dragging operation is performed on a progress bar on the map, generating the third adjustment instruction according to a first waypoint density value obtained after the dragging operation is performed on the progress bar, different locations of the progress bar corresponding to different waypoint density values, the first waypoint density value corresponding to a second quantity, and the third adjustment instruction being used for instructing to adjust the quantity of the waypoints displayed on the map to the second quantity.

Figure 14:
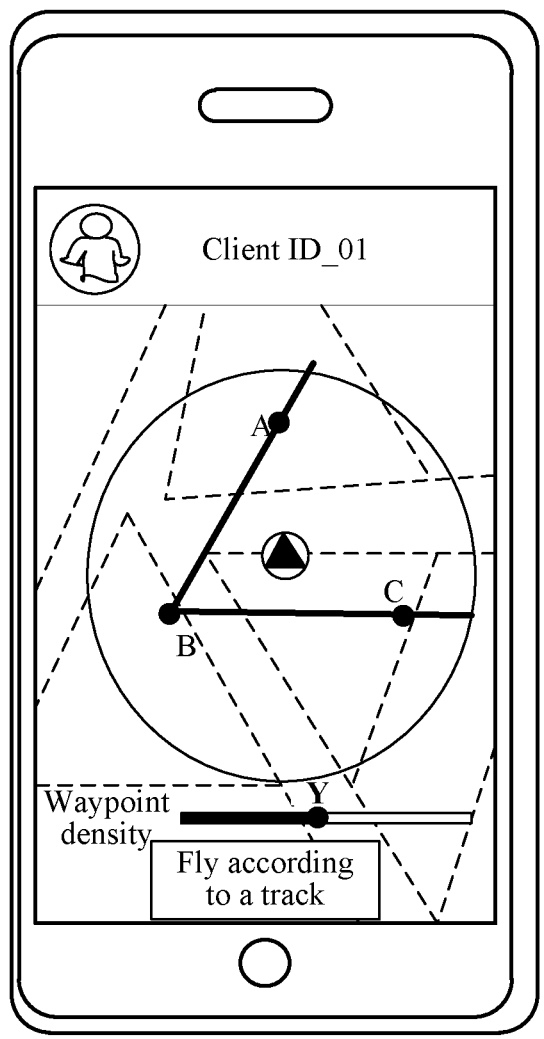
FIG. 14 is a schematic diagram of still another unmanned aerial vehicle control method according to an embodiment of the presently disclosed technology.

For example, as shown in FIG. 14, when it is detected that the dragging operation is performed on the progress bar on the map on the client, for example, the progress bar is adjusted to a quantity, for example, the second quantity Y corresponding to the first waypoint density value, the quantity of the waypoints displayed on the map is adjusted to the second quantity Y.

It should be noted that, the adjusting the quantity of waypoints may be implemented by but is not limited to by adjusting the predetermined threshold compared with an angle. The angle is an angle between line segments formed by the discrete points. A greater predetermined threshold indicates more angles less than the predetermined threshold and a larger quantity of generated waypoints. A smaller predetermined threshold indicates fewer angles less than the predetermined threshold and a smaller quantity of generated waypoints.

3) when it is detected that a deletion operation is performed on the waypoints, generating the third adjustment instruction according to the deletion operation, the third adjustment instruction being used for instructing to delete the waypoints indicated by the deletion operation from the map.

For example, when it is detected that the deletion operation is performed by the client on the waypoints displayed on the map, for example, a waypoint B is deleted, the waypoint B is deleted, so that the unmanned aerial vehicle no longer flies across the waypoint B.

4) when it is detected that a track adjusting operation is performed on the trajectory, generating the third adjustment instruction according to the track adjusting operation, the track adjusting operation being used for adjusting the trajectory from a first track to a second track, the third adjustment instruction being used for instructing to adjust the quantity of the waypoints displayed on the map to a third quantity, and the third quantity being obtained according to the second track.

For example, it is detected that the track adjusting operation is performed on the trajectory. For example, the trajectory is adjusted from the first track to the second track. For example, the second track is obtained by changing the radian of the first track such as increasing the radian. In this case, when a first predetermined angle is not changed, the quantity of the waypoints displayed on the map is increased correspondingly.

In the foregoing implementation, the quantity of the waypoints may further be adjusted by using the client, so that the flight precision of the unmanned aerial vehicle can be adjusted. That is, an increasing quantity of the waypoints indicates that the flight track of the unmanned aerial vehicle is closer to the drawn trajectory, so that the drawn trajectory can be accurately re-presented.

Based on the above, in some embodiments, at a device having one or more processors, memory, a display generation component (e.g., a display, a projector, a headset), and a touch-sensitive input surface (e.g., a touch-pad, a touch-screen display), the method for controlling a respective unmanned vehicle includes: displaying a map (e.g., a 2D or 3D geographic map showing terrains and/or streets, or a 2D and 3D interior map showing furniture, room dividers, etc., a 2D or 3D map showing inside of a cave, tunnel, etc.) using the display generation component. While displaying the map using the display generation component, the device detects a first touch input on the touch-sensitive surface, including detecting first movement of a first contact across the touch-sensitive surface to form a first movement path on the touch-sensitive surface. In response to detecting the first movement of the first contact across the touch-sensitive surface to form the first movement path on the touch-sensitive surface: the device overlays a trajectory on the map in accordance with the first movement path formed on the touch-sensitive surface. In some embodiments, the trajectory is a 2D trajectory when initially created, and is automatically converted to a three dimensional trajectory in accordance with preset altitude requirements and user specification inputs. In addition, the device also automatically generating a plurality of waypoints along the trajectory; and displays respective representations of the plurality of waypoints on the line. The device then sends instructions to a respective unmanned vehicle (e.g., an unmanned aerial vehicle) in accordance with the trajectory and the plurality of waypoints, wherein the respective unmanned vehicle moves in accordance with trajectory by executing the instructions. In some embodiments, the device sends the instructions when the user has finished editing the trajectory and provided a confirmation input to confirm that the trajectory is satisfactory to the user.

In some embodiments, while displaying the plurality of automatically generated waypoints along the line, the device detects an editing input directed to one or more of the plurality of automatically generated waypoints. In response to detecting the editing input, the device edits the one or more of the plurality of automatically generated waypoints. In some embodiments, editing includes moving at least a first waypoint of the plurality of automatically generated waypoints (e.g., in response to a select and drag gesture detected on the first waypoint); and adjusting the trajectory in accordance with movement of the at least the first waypoint of the plurality of automatically generated waypoints (e.g., as the first waypoint is dragged by the drag gesture, the trajectory is reshaped in accordance with the movement of the first waypoint). In some embodiments, editing the one or more of the plurality of automatically generated waypoints includes: deleting at least a second waypoint of the plurality of automatically generated waypoints (e.g., in response to a cross gesture on the second waypoint); and adjusting the trajectory in accordance with deletion of the at least the second waypoint of the plurality of automatically generated waypoints (e.g., the trajectory no longer passes the location of the second waypoint once the second waypoint is deleted). In some embodiments, editing the one or more of the plurality of automatically generated waypoints includes: splitting at least a third waypoint of the plurality of automatically generated waypoints into the third waypoint and a fourth waypoint distinct from the plurality of automatically generated waypoints (e.g., in accordance with a de-pinch gesture detected on the third waypoint, the fourth waypoint is pulled out of the location of the third waypoint); and moving the fourth waypoint in accordance with a drag input on the touch-sensitive surface (e.g., in accordance with a select and drag gesture directed to the fourth waypoint, or a continuation of the de-pinch gesture); and adjusting the trajectory in accordance with a final location of the fourth waypoint that is distinct from the plurality of automatically generated waypoints (e.g., the adjusted trajectory passes through the fourth waypoint and all other waypoints still remaining on the map). In some embodiments, in accordance with the relative location of the two contacts in the de-pinch gesture and the location of the third waypoint, the fourth waypoint is either pulled out from the third waypoint in a first direction (e.g., following the lower contact or left contact of the de-pinch gesture) or pulled out from the third waypoint in a second direction (e.g., following the upper contact or right contact of the de-pinch gesture).

In some embodiments, the device detects a selection input (e.g., a tap input) directed to a respective waypoint currently displayed along the trajectory on the map, wherein the map and the trajectory are displayed with a first zoom level; and in response to detecting the selection input, the device displays a portion of the map with a second zoom level greater than (e.g., 10 times greater) the first zoom level, wherein the portion of the map corresponds to a location of the respective waypoint that is selected by the selection input (e.g., the space near the respective waypoint is shown on the display, such that the user can specify a local inflight stunt to be performed by the respective unmanned vehicle in the vicinity of the respective waypoint). In some embodiments, the user interface on the device displays selectable affordances that correspond to a plurality of preset movement patterns (e.g., cursive words, zigzag, waves in altitude, etc.), a plurality of stunts (e.g., make a flip, make a dive, do a beeline, do a vertical loop, etc.), and/or a plurality of actions (e.g., release a package that is carried onboard, play a specific music clip, release an alert, shoot out a flare signal, etc.). When a user input selecting one or more affordances, the corresponding movement patterns, stunts, and/or actions are associated with the respective waypoint, and used to modify the local portion of the trajectory and generate additional instructions to cause the respective unmanned vehicle to perform these movement patterns, stunts, and/or actions when moving along the line.

In some embodiments, while displaying the portion of the map at the second zoom level, the device detects a second touch input on the touch-sensitive surface, including detecting second movement of a second contact across the touch-sensitive surface to form a second movement path on the touch-sensitive surface. In response to detecting the second movement of the second contact across the touch-sensitive surface to form the second movement path on the touch-sensitive surface, the device modifies a local portion of the trajectory corresponding to the portion of the map in accordance with the second movement path of the second contact. In some embodiments, the local portion of the trajectory is displayed within a three-dimensional space corresponding to a three-dimensional physical coordinates (e.g., geographic coordinates and altitude coordinate) of the respective waypoint, and the local portion of the trajectory is displayed with a plurality of automatically generated adjustment handles for adjusting the local portion of the trajectory in the three-dimensional space in accordance with one or more editing inputs directed to the adjustment handles (e.g., the adjustment handles are analogous to the automatically generated waypoints initially displayed along the trajectory when the trajectory is displayed at the first zoom level).

In some embodiments, after sending the instructions to the respective unmanned vehicle in accordance with the trajectory and the plurality of waypoints, and the respective unmanned vehicle moves in accordance with an initial portion of trajectory by executing one or more of the instructions, the device receives updated coordinates of the respective unmanned vehicle along the initial portion of the line. The device makes the initial portion of trajectory un-editable while maintaining at least a later portion of the trajectory editable by user inputs (e.g., the initial portion of the trajectory is grayed out, and the later portion of the trajectory remains editable by the waypoints along the later portion of the line, and there is a buffer between the initial portion and the later portion of the trajectory which is not editable due to delays in modifying the current movement of the respective unmanned vehicle). In some embodiments, the methods used to modify the trajectory and the waypoints still work for the later portion of the line, and updated instructions are generated and sent to the respective unmanned vehicle where the updated instructions replaced one or more unexecuted instructions previously received by the respective unmanned vehicle, such that the respective unmanned vehicle moves along the updated trajectory in accordance with the updated instructions. In some embodiments, the respective unmanned vehicle modifies the trajectory based on actual conditions along the trajectory during flight, and the modifications are communicated back to the control device and represented on the map. The user is provided with options to adjust later portion of the trajectory based on the actual trajectory of the unmanned vehicle.

Other details of the method are disclosed earlier with various embodiments, and can be combined with the features disclosed herein without limitation.

It should be noted that, to simplify the description, the foregoing implementations are described as a series of action combination. But a person skilled in the art should know that the presently disclosed technology is not limited to any described sequence of the action, as some steps can adopt other sequences or can be performed simultaneously according to the presently disclosed technology. Secondarily, a person skilled in the art should know that the embodiments described in the specification all belong to preferred embodiments and the involved actions and modules are not necessary for the presently disclosed technology.

By means of description of the foregoing implementations, a person skilled in the art may clearly learn that the method in the foregoing embodiments may be implemented by relying on software and a necessary common hardware platform or by using hardware, but the former one is a preferred implementation in many cases. Based on such an understanding, the technical solutions in the presently disclosed technology essentially or the part contributing to the existing technology may be implemented in a form of a software product. The computer software product is stored in a storage medium (such as an ROM/RAM, a magnetic disk, or an optical disc), and includes several instructions for instructing a terminal device (which may be a mobile phone, a computer, a server, a network device, and the like) to perform the methods described in the embodiments of the presently disclosed technology.

Figure 15:
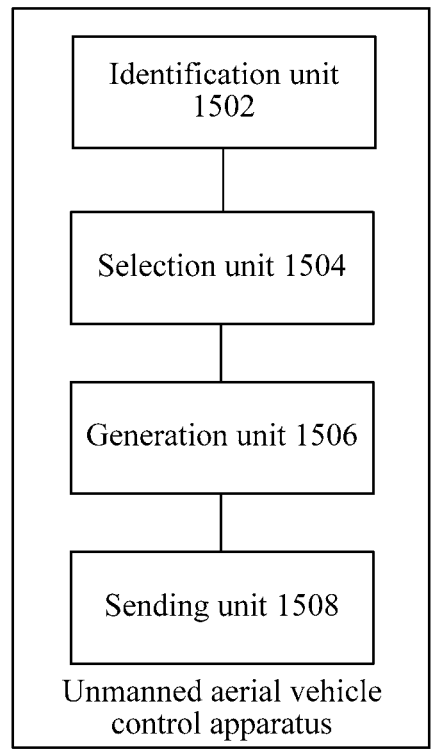
FIG. 15 is a schematic diagram of an unmanned aerial vehicle control apparatus according to an embodiment of the presently disclosed technology.

According to an embodiment of the presently disclosed technology, an unmanned aerial vehicle control apparatus for performing the foregoing unmanned aerial vehicle control method is further provided. As shown in FIG. 15, the apparatus includes:

an identification unit 1502, configured to identify a trajectory drawn on a map displayed on a client;

a selection unit 1504, configured to select a plurality of discrete points on the trajectory;

a generation unit 1506, configured to generate coordinates of waypoints according to coordinates of the plurality of discrete points on the map; and a sending unit 1508, configured to send the coordinates of the waypoints to an unmanned aerial vehicle, so that the unmanned aerial vehicle flies according to the coordinates of the waypoints.

Optionally, in this embodiment, the foregoing unmanned aerial vehicle control apparatus may be applied to but is not limited to a client running in a terminal. The client is configured to control the flight of an unmanned aerial vehicle. The foregoing unmanned aerial vehicle may include but is not limited to at least one of the following: an unmanned airplane, an unmanned aircraft, an unmanned airship, an unmanned balloon, or the like.

For example, a map is displayed on a client ID_01 on a terminal interface shown in the left part of FIG. 3. A solid triangle is used as an origin of coordinates on the map. A trajectory drawn on the map, that is, a thick solid line on the terminal interface shown in the left part of FIG. 3 is identified. A plurality of discrete points is selected on the trajectory, that is, solid dots on the thick solid line shown in the left part of FIG. 3 are selected. Then, coordinates of waypoints are selected according to coordinates of the plurality of discrete points on the map. After an instruction of "flying according to a track" is received, the terminal sends the coordinates of the waypoints to an unmanned aerial vehicle, so that the unmanned aerial vehicle flies according to the coordinates of the waypoints, for example, flies according to a track of the thick solid line shown in the right part of FIG. 3. The coordinates of the waypoints required during the flight of the unmanned aerial vehicle are automatically generated by using the coordinates that are on the map and that are of the plurality of discrete points selected on the drawn trajectory, so that a control operation performed on the flight of the unmanned aerial vehicle is simplified and the efficiency of controlling the flight of the unmanned aerial vehicle is improved. The foregoing is merely exemplary, and no limitation is set in this embodiment.

It should be noted that, in this embodiment, a trajectory drawn on a map displayed on the client is identified, a plurality of discrete points is selected on the trajectory, coordinates of waypoints are generated according to coordinates of the plurality of discrete points on the map, and the coordinates of the waypoints are sent to the unmanned aerial vehicle, so that the unmanned aerial vehicle flies according to the coordinates of the waypoints. In other words, the client identifies a trajectory drawn on a displayed map and selects a plurality of discrete points on the trajectory, so that coordinates of waypoints are automatically generated by using coordinates of the plurality of discrete points on the map, and the unmanned aerial vehicle flies according to the automatically generated coordinates of the waypoints. In this way, coordinates of all waypoints do not need to be manually set, thereby simplifying a control operation performed on the flight of the unmanned aerial vehicle and improving the efficiency of controlling the unmanned aerial vehicle. In addition, by identifying a drawn trajectory, and generating waypoints according to a plurality of discrete points selected on the trajectory, a process of automatically generating coordinates of the waypoints may further be simplified, thereby reducing a waypoint generation time period and improving the waypoint generation efficiency.

Optionally, in this embodiment, the foregoing operation of drawing the trajectory may be implemented in but is not limited to at least one of the following manners: drawing by using a touchscreen or drawing by using an external input device. For example, the external input device may be an electronic stylus.

Optionally, in this embodiment, the trajectory drawn on the displayed map may be of any shape, for example, may be a trajectory formed by a thick solid line shown in FIG. 4. The foregoing is merely exemplary, and no limitation is set in this embodiment.

Optionally, in this embodiment, the selection unit includes: 1) an obtaining module, configured to obtain a start point and an end point of the trajectory; and 2) a selection module, configured to select N discrete points between the start point and the end point of the trajectory, the plurality of discrete points including: the start point, the N discrete points, and the end point; each two neighboring discrete points of the plurality of discrete points forming a line segment, an angle formed by each two neighboring line segments being less than a first predetermined threshold, and N≥1.

That is, in this embodiment, the foregoing trajectory at least includes a start point and an end point. Further, N discrete points are then selected between the start point and the end point. N≥1. In this way, the plurality of discrete points on the trajectory for generating the waypoints is obtained. Each two neighboring discrete points of the plurality of discrete points form a line segment, and an angle formed by each two neighboring line segments is less than a first predetermined threshold. For example, the drawn trajectory is shown in FIG. 5. A start point A and an end point D on the trajectory are obtained. Further, another two discrete points, that is, a discrete point B and a discrete point C between the start point A and the end point D are obtained. Both an angle α formed by the discrete points A, B, and C and an angle β formed by the discrete points B, C, and D are less than the predetermined threshold. In other words, in this embodiment, a sharper angle on the trajectory is more likely to be selected as one of the N discrete points, to ensure that a waypoint is generated at each important inflection point on the trajectory, so that when the unmanned aerial vehicle flies according to the coordinates of the waypoints, the track indicated by the trajectory can be accurately re-presented.

Optionally, in this embodiment, the selection unit may select the plurality of discrete points by using the following steps: obtaining a start point and an end point of the trajectory; and selecting N discrete points between the start point and the end point of the trajectory, the plurality of discrete points including: the start point, the N discrete points, and the end point; each two neighboring discrete points of the plurality of discrete points forming a vector, an angle formed by each two neighboring vectors being greater than a predetermined threshold, and N≥1.

It should be noted that, in another optional manner, the terminal may determine, by but is not limited to by obtaining an angle between vectors formed by the discrete points, whether a waypoint is generated. The foregoing is merely exemplary. For a process of selecting a discrete point, refer to the foregoing example, and details are not described in this embodiment again.

Optionally, in this embodiment, the foregoing map may obtain different display scales, that is, map scales by but is not limited to by performing a scaling operation. In this embodiment, the coordinates of the waypoints of the unmanned aerial vehicle may be determined according to but is not limited to a current display scale of the map.

Optionally, in this embodiment, the generation unit may include at least one of the following:

1) a conversion module, configured to convert the coordinates of the discrete points on the map to the coordinates of the waypoints according to a current display scale of the map; or 2) a setting module, configured to set the coordinates of the discrete points on the map as the coordinates of the waypoints.

It should be noted that, in this embodiment, in an optional implementation, the coordinates of the discrete points on the map may be converted to the coordinates of the waypoints according to the current display scale of the map. The coordinate conversion may be performed according to but is not limited to different coordinate systems. For example, an absolute coordinate system is established by using a center of the map (or a vertex of the map) as an origin, and the coordinates of the discrete points on the map are converted, to obtain the coordinates of the waypoints. For another example, a relative coordinate system is established by using the start point of the trajectory as an origin, and the coordinates of the discrete points on the map and relative to the start point are converted, to obtain the coordinates of the waypoints. By converting the coordinates of the discrete points to actual coordinates, the unmanned aerial vehicle is accurately controlled, to ensure that the unmanned aerial vehicle can fly according to the drawn trajectory.

In addition, in another optional implementation, the coordinates of the discrete points on the map may alternatively be set as the coordinates of the waypoints. For example, the coordinates, such as GPS coordinates of the discrete points on the map may be directly set as the coordinates of the waypoints. For another example, a map having a display scale corresponding to the display scale of the map displayed on the client is stored in the unmanned aerial vehicle, and the coordinates of the discrete points on the map are directly used as the coordinates of the waypoints and sent to the unmanned aerial vehicle. In this way, the unmanned aerial vehicle can fly, with no coordinate conversion being performed, according to a corresponding trajectory, thereby simplifying an operation of controlling the flight of the unmanned aerial vehicle.

Optionally, in this embodiment, after the generating coordinates of waypoints according to coordinates of the plurality of discrete points on the map, the method further includes: displaying the waypoints on the map according to the coordinates of the waypoints. For example, as shown in FIG. 6, a map is displayed on a client ID_01. A solid triangle is used as an origin (0, 0) of coordinates on the map. After the coordinates of the waypoints are generated by using the coordinates of the plurality of discrete points on the map, the waypoints, such as solid dots on a thick solid line shown in FIG. 6 are displayed on the map.

Optionally, in this embodiment, after the displaying the waypoints on the map according to the coordinates of the waypoints, the method further includes:

1) obtaining a first adjustment instruction, and adjusting a flight parameter of the unmanned aerial vehicle at each waypoint in response to the first adjustment instruction, the flight parameter at least including a flight height or a flight speed; or 2) obtaining a second adjustment instruction, and adjusting the coordinates of the waypoints in response to the second adjustment instruction; or 3) obtaining a third adjustment instruction, and adjusting, in response to the third adjustment instruction, a quantity of the waypoints displayed on the map.

It should be noted that, in this embodiment, the quantity of the waypoints may be adjusted in but is not limited to at least one of the following manners: inputting a quantity to be adjusted to, adjusting a progress bar, directly deleting or adding waypoints, adjusting the trajectory, or adjusting the first predetermined threshold used for comparing with the angles between the line segments formed by the discrete points.

Optionally, in this embodiment, when being controlled to fly according to the coordinates of the waypoints, the unmanned aerial vehicle may perform a predetermined flying action at a predetermined waypoint. The foregoing flying action may be but is not limited to a user-defined action. For example, by setting a flight parameter, the unmanned aerial vehicle performs an action of spirally rising at the predetermined waypoint, or flies according to a predetermined figure in a three-dimensional space near the waypoint, for example, flies according to a square track with the waypoint being a center.

Optionally, in this embodiment, that the client sends the coordinates of the waypoints to the unmanned aerial vehicle includes: 1) sending coordinates of all waypoints to the unmanned aerial vehicle, so that the unmanned aerial vehicle performs coordinate positioning by using a GPS, thereby controlling the flight of the unmanned aerial vehicle; 2) performing synchronous control by using the client, to sequentially send the coordinates of the waypoints to the unmanned aerial vehicle, so that the unmanned aerial vehicle is controlled, by using the client, to perform synchronous flying.

According to this embodiment of the presently disclosed technology, the client identifies a trajectory drawn on a displayed map and selects a plurality of discrete points on the trajectory, so that coordinates of waypoints are automatically generated by using coordinates of the plurality of discrete points on the map, and the unmanned aerial vehicle flies according to the automatically generated coordinates of the waypoints. In this way, coordinates of all waypoints do not need to be manually set, thereby simplifying a control operation performed on the flight of the unmanned aerial vehicle and improving the efficiency of controlling the unmanned aerial vehicle. In addition, by identifying a drawn trajectory, and generating waypoints according to a plurality of discrete points selected on the trajectory, a process of automatically generating coordinates of the waypoints may further be simplified, thereby reducing a waypoint generation time period and improving the waypoint generation efficiency.

In an implementation, the selection unit 1504 includes:

an obtaining module, configured to obtain a start point and an end point of the trajectory; and a selection module, configured to select N discrete points between the start point and the end point of the trajectory, the plurality of discrete points including: the start point, the N discrete points, and the end point; each two neighboring discrete points of the plurality of discrete points forming a line segment, an angle formed by each two neighboring line segments being less than a first predetermined threshold, and N≥1.

The selecting N discrete points between the start point and the end point of the trajectory may include but is not limited to: determining an angle of each pair of line segments formed by a plurality of track points identified on the trajectory, to select N discrete points from the plurality of track points.

Details are described with reference to the example shown in FIG. 5. It is assumed that the drawn trajectory is shown on a terminal interface in the left part of FIG. 5. The first predetermined threshold is 120 degrees. As shown in the right part of FIG. 5, a start point A and an end point D on the trajectory are obtained. Further, another two discrete points, that is, a discrete point B and a discrete point C between the start point A and the end point D are obtained. An angle α formed by the discrete points A, B, and C is 60 degrees and an angle β formed by the discrete points B, C, and D is 80 degrees, and both angles are less than the predetermined threshold 120 degrees after comparison. That is, when the trajectory is shown in FIG. 5, the selected discrete points are the discrete points A, B, C, and D, as shown in FIG. 5.

In the foregoing implementation, a plurality of discrete points on the trajectory including the start point of the trajectory, the selected N discrete points and the end point of the trajectory is obtained. Each two neighboring discrete points of the plurality of discrete points form a line segment, and an angle formed by each two neighboring line segments is less than a predetermined threshold. That is, in the foregoing implementation, a discrete point corresponding to a sharp angle on the trajectory is selected as one of the N discrete points, to ensure that a waypoint is generated at each important inflection point on the trajectory, so that when the unmanned aerial vehicle flies according to the coordinates of the waypoints, the track indicated by the trajectory can be accurately re-presented.

In an implementation, the identification unit 1502 includes: an identification module, configured to identify a plurality of track points on the trajectory, the plurality of track points including the start point and the end point.

The selection module includes: a determining submodule, configured to determine whether an angle formed by a first line segment and a second line segment is less than a second predetermined threshold, the first line segment being a line segment formed by a first track point and a middle track point of three neighboring track points of the plurality of track points, the second line segment being a line segment formed by the middle track point and a second track point of the three neighboring track points; and a selection submodule, configured to: when the angle formed by the first line segment and the second line segment is less than the second predetermined threshold, select the middle track point as one of the N discrete points.

In a process of identifying the trajectory drawn on the map, a plurality of track points is identified on the trajectory. The plurality of track points may include a start point and an end point. By determining an angle of each pair of line segments formed by the plurality of track points, N discrete points are selected from the plurality of track points. For example, the foregoing track points may be but are not limited to identified pixels. The foregoing is merely exemplary, and no limitation is set in this embodiment.

Details are described with reference to the following example. It is assumed that the second predetermined threshold is 120 degrees, and five track points having a location relationship shown in FIG. 7 are identified on the trajectory, that is, a track point A used as a start point, a track point E used as an end point, and a track point B, a track point C, and a track point D located between the start point A and the end point E. The track point A, the track point B, and the track point C are three neighboring track points; the track point B, the track point C, and the track point D are three neighboring track points; the track point C, the track point D, and the track point E are three neighboring track points. Two line segments, that is, a line segment AB and a line segment BC are formed by the track point A, the track point B, and the track point C, and an angle a between the line segment AB and the line segment BC is 100 degrees; two line segments, that is, a line segment BC and a line segment CD are formed by the track point B, the track point C, and the track point D, and an angle b between the line segment BC and the line segment CD is 90 degrees; two line segments, that is, a line segment CD and a line segment DE are formed by the track point C, the track point D, and the track point E, and an angle c between the line segment CD and the line segment DE is 150 degrees.

Further, it is determined whether the angle formed by each two line segments is less than the second predetermined threshold 120 degrees. FIG. 7 is used as an example for description. The 100 degrees corresponding to the angle a between the line segment AB and the line segment BC is less than the second predetermined threshold 120 degrees; the 90 degrees corresponding to the angle b between the line segment BC and the line segment CD is less than the second predetermined threshold 120 degrees; the 150 degrees corresponding to the angle c between the line segment CD and the line segment DE is greater than the second predetermined threshold 120 degrees. That is, when the track points shown in FIG. 7 are identified on the trajectory, middle track points, that is, the track point B and the track point C of the angle a and the angle b whose degrees are less than the second predetermined threshold 120 degrees may be selected as discrete points of the N discrete points. Then, the track point B and the track point C, and the track point A used as the start point and the track point E used as the end point are finally selected as the discrete points on the trajectory.

In the foregoing implementation, the plurality of track points is identified on the trajectory first, and it is determined whether the angle between the first line segment and the second line segment formed by three neighboring track points is less than the second predetermined threshold, to determine whether to select one of the N discrete points that is between the start point and the end point on the trajectory. That is, the discrete points used for generating the waypoints are directly selected by using the location relationship between the identified track points on the trajectory. In this way, the process of automatically generating the coordinates of the waypoints is simplified, and the waypoint generation efficiency is improved.

In an implementation, the generation unit 1506 includes one or more of the following:

1) a conversion module, configured to convert the coordinates of the discrete points on the map to the coordinates of the waypoints according to a current display scale of the map.

The coordinates of the discrete points on the map may be converted to the coordinates of the waypoints according to the current display scale of the map. The coordinate conversion may be performed according to but is not limited to different coordinate systems.

For example, as shown in FIG. 8, an absolute coordinate system is established by using a center of the map (or a vertex of the map, which is merely exemplary herein) as an origin (0, 0), and the coordinates of the selected discrete points, such as a discrete point A to a discrete point E in FIG. 8 on the map are converted according to the current display scale of the map, to obtain the coordinates of the waypoints.

For another example, as shown in FIG. 9, a relative coordinate system is established by using a start point A of the trajectory as an origin (0, 0), and coordinates of discrete points A to E on the map and relative to the start point A are converted according to the current display scale of the map, to obtain the coordinates of the waypoints.

That is, by converting the coordinates of the discrete points on the map to the coordinates of the waypoints according to the current display scale of the map, the unmanned aerial vehicle is accurately controlled, to ensure that the unmanned aerial vehicle can fly according to the drawn trajectory.

2) a setting module, configured to set the coordinates of the discrete points on the map as the coordinates of the waypoints.

The coordinates of the discrete points on the map may be directly set as the coordinates of the waypoints.

For example, when the coordinates of the discrete points on the map are GPS coordinates shown in FIG. 10, the GPS coordinates of the discrete points on the map, such as latitude/longitude coordinates may be directly set as the coordinates of the waypoints.

For another example, a map having a display scale corresponding to the display scale of the map displayed on the client is stored in the unmanned aerial vehicle, and the coordinates of the discrete points on the map are directly used as the coordinates of the waypoints.

That is, the coordinates of the discrete points on the map are directly used as the coordinates of the waypoints and sent to the unmanned aerial vehicle. In this way, the unmanned aerial vehicle can fly, with no coordinate conversion being performed, according to a corresponding trajectory, thereby simplifying an operation of controlling the flight of the unmanned aerial vehicle.

Details are described with reference to the following example. It is assumed that three discrete points, that is, a discrete point A, a discrete point B, and a discrete point C are selected on the trajectory. A relationship among locations of the three discrete points is shown in FIG. 11. A solid triangle is an origin (0, 0) of coordinates. A coordinate of each of the three discrete points is correspondingly A (0, 62), B (−54, −18), and C (56, −14). Further, assuming that the display scale of the map displayed on the foregoing client ID_01 is the same as the display scale of the map stored in the unmanned aerial vehicle, the coordinates of the discrete points on the map, that is, the A (0, 62), B (−54, −18), and C (56, −14) are directly used as the coordinates of the waypoints and sent to the unmanned aerial vehicle.

In the foregoing implementation, the coordinates of the discrete points on the map are converted to the coordinates of the waypoints according to the current display scale of the map, or the coordinates of the discrete points on the map are set as the coordinates of the waypoints. In the foregoing two manners, the coordinates of the waypoints are automatically generated by using the coordinates of the discrete points on the map, so that the accuracy of the generated coordinates of the waypoints is ensured, and the drawn trajectory can be accurately re-presented when the unmanned aerial vehicle flies according to the coordinates of the waypoints.

In an implementation, the unmanned aerial vehicle control apparatus further includes: a display unit, configured to: after the generating coordinates of waypoints according to coordinates of the plurality of discrete points on the map, display the waypoints on the map according to the coordinates of the waypoints.

For example, as shown in FIG. 6, a map is displayed on a client ID_01. A solid triangle is used as an origin (0, 0) of coordinates on the map. After the coordinates of the waypoints are generated by using the coordinates of the plurality of discrete points on the map, the waypoints, such as solid dots on a thick solid line shown in FIG. 6 are displayed on the map.

After the waypoints are displayed on the trajectory drawn on the map, an operation includes but is not limited to an editing and adjusting operation may be performed on the generated waypoints. The editing and adjusting operation may include but is not limited to at least one of the following: adjusting a flight parameter at each waypoint, adjusting the coordinates of the waypoints, adjusting a quantity of the waypoints, or setting a user-defined action at a predetermined waypoint.

In the foregoing implementation, by displaying the waypoints on the map, not only can the waypoints across which the unmanned aerial vehicle will fly be directly seen, but also an editing operation may be directly performed on the displayed waypoints, so that the unmanned aerial vehicle can be synchronous controlled in real time.

In an implementation, the unmanned aerial vehicle control apparatus further includes one or more of the following:

1) a first obtaining unit, configured to: after the displaying the waypoints on the map according to the coordinates of the waypoints, obtain a first adjustment instruction, and adjust a flight parameter of the unmanned aerial vehicle at each waypoint in response to the first adjustment instruction, the flight parameter at least including a flight height or a flight speed.

For example, when the client detects that a height at which a waypoint A is located is adjusted, for example, adjusted from 10 meters to 6 meters, the first adjustment instruction is generated in response to the operation, to instruct the unmanned aerial vehicle to adjust the flight height from the current 10 meters to 6 meters. After receiving the first adjustment instruction, the unmanned aerial vehicle performs a corresponding adjustment to reduce the flight height.

2) a second obtaining unit, configured to: after the displaying the waypoints on the map according to the coordinates of the waypoints, obtain a second adjustment instruction, and adjust the coordinates of the waypoints in response to the second adjustment instruction.

For example, when the client detects that a location at which of a waypoint A is located is adjusted, for example, translated 10 meters eastward from a current location, the second adjustment instruction is generated in response to the operation, to instruct the unmanned aerial vehicle to translate 10 meters eastward from the current location. After receiving the second adjustment instruction, the unmanned aerial vehicle performs a corresponding adjustment to translate 10 meters eastward.

3) a third obtaining unit, configured to: after the displaying the waypoints on the map according to the coordinates of the waypoints, obtain a third adjustment instruction, and adjust, in response to the third adjustment instruction, a quantity of the waypoints displayed on the map.

For example, when the client detects that the quantity of the waypoints is reduced, for example, a waypoint B is deleted, the third adjustment instruction is generated in response to the operation, to instruct the unmanned aerial vehicle to delete the waypoint B. After receiving the third adjustment instruction, the unmanned aerial vehicle performs a corresponding adjustment to avoid flying across the waypoint B.

After the drawn trajectory is obtained, the drawn trajectory may be canceled. For example, a "redraw" button shown in FIG. 12 is clicked on to update the drawn trajectory.

In the foregoing implementation, after the waypoints are displayed on the map, different editing and adjusting operations may be performed on the waypoints displayed on the map.

In an implementation, the third obtaining unit includes one or more of the following:

1) a first generation module, configure to: when it is detected that the client receives an input first quantity of the waypoints, generate the third adjustment instruction according to the first quantity, the third adjustment instruction being used for instructing to adjust the quantity of the waypoints displayed on the map to the first quantity.

For example, as shown in FIG. 13, when it is detected that the current quantity of the waypoints input by using a setting interface of the client, for example, the first quantity is X, the quantity of the waypoints displayed on the map is adjusted to the first quantity X. For another example, a quantity increasing button may be set on the map, to directly input the first quantity of the waypoints. This embodiment is not limited to the foregoing two manners.

It should be noted that, the adjusting the quantity of the waypoints may include but is not limited to: selecting first X track points of a smallest angle formed by a first line segment and a second line segment as waypoints.

2) a second generation module, configured to: when it is detected that a dragging operation is performed on a progress bar on the map, generate the third adjustment instruction according to a first waypoint density value obtained after the dragging operation is performed on the progress bar, different locations of the progress bar corresponding to different waypoint density values, the first waypoint density value corresponding to a second quantity, and the third adjustment instruction being used for instructing to adjust the quantity of the waypoints displayed on the map to the second quantity.

For example, as shown in FIG. 14, when it is detected that the dragging operation is performed on the progress bar on the map on the client, for example, the progress bar is adjusted to a quantity, for example, the second quantity Y corresponding to the first waypoint density value, the quantity of the waypoints displayed on the map is adjusted to the second quantity Y.

It should be noted that, the adjusting the quantity of waypoints may be implemented by but is not limited to by adjusting the predetermined threshold compared with an angle. The angle is an angle between line segments formed by the discrete points. A greater predetermined threshold indicates more angles less than the predetermined threshold and a larger quantity of generated waypoints. A smaller predetermined threshold indicates fewer angles less than the predetermined threshold and a smaller quantity of generated waypoints.

3) a third generation module, configured to: when it is detected that a deletion operation is performed on the waypoints, generate the third adjustment instruction according to the deletion operation, the third adjustment instruction being used for instructing to delete the waypoints indicated by the deletion operation from the map.

For example, when it is detected that the deletion operation is performed by the client on the waypoints displayed on the map, for example, a waypoint B is deleted, the waypoint B is deleted, so that the unmanned aerial vehicle no longer flies across the waypoint B.

4) a fourth generation module, configured to: when it is detected that a track adjusting operation is performed on the trajectory, generate the third adjustment instruction according to the track adjusting operation, the track adjusting operation being used for adjusting the trajectory from a first track to a second track, the third adjustment instruction being used for instructing to adjust the quantity of the waypoints displayed on the map to a third quantity, and the third quantity being obtained according to the second track.

For example, it is detected that the track adjusting operation is performed on the trajectory. For example, the trajectory is adjusted from the first track to the second track. For example, the second track is obtained by changing the radian of the first track such as increasing the radian. In this case, when a first predetermined angle is not changed, the quantity of the waypoints displayed on the map is increased correspondingly.

In the foregoing implementation, the quantity of the waypoints may further be adjusted by using the client, so that the flight precision of the unmanned aerial vehicle can be adjusted. That is, an increasing quantity of the waypoints indicates that the flight track of the unmanned aerial vehicle is closer to the drawn trajectory, so that the drawn trajectory can be accurately re-presented.

Figure 16:
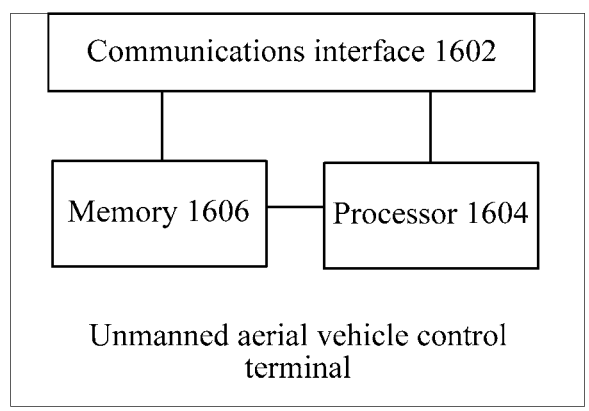
FIG. 16 is a schematic diagram of an unmanned aerial vehicle control terminal according to an embodiment of the presently disclosed technology.

According to an embodiment of the presently disclosed technology, an unmanned aerial vehicle control terminal for performing the foregoing unmanned aerial vehicle control method is further provided. As shown in FIG. 16, the terminal includes:

a communications interface 1602, configured to: obtain a trajectory, and send coordinates of waypoints to an unmanned aerial vehicle, so that the unmanned aerial vehicle flies according to the coordinates of the waypoints;

a processor 1604 connected to the communications interface 1602 and configured to: identify the trajectory drawn on a map displayed on a client, select a plurality of discrete points on the trajectory, and generate the coordinates of the waypoints according to coordinates of the plurality of discrete points on the map; and a memory 1606 connected to the communications interface 1602 and the processor 1604, and configured to store the trajectory, the coordinates of the plurality of discrete points on the map, and the coordinates of the waypoints.

Optionally, for specific examples of this embodiment, refer to the foregoing embodiments of the unmanned aerial vehicle control method and the unmanned aerial vehicle control apparatus, and details are not described in this embodiment again.

An embodiment of the presently disclosed technology further provides a storage medium. Optionally, in this embodiment, the foregoing storage medium may be located in at least one of a plurality of network devices in a computer network.

Optionally, in this embodiment, the storage medium is set to store program code for performing the following steps:

S1: Identify a trajectory drawn on a map displayed on a client.

S2: Select a plurality of discrete points on the trajectory.

S3: Generate coordinates of waypoints according to coordinates of the plurality of discrete points on the map.

S4: Send the coordinates of the waypoints to an unmanned aerial vehicle, so that the unmanned aerial vehicle flies according to the coordinates of the waypoints.

Optionally, in this embodiment, the storage medium may include but is not limited to a medium that may store program code such as an USB flash drive, a read-only memory (ROM), a random access memory (RAM), a removable hard disk, a magnetic disk, an optical disk, or the like.

Optionally, for specific examples of this embodiment, refer to the foregoing embodiments of the unmanned aerial vehicle control method and the unmanned aerial vehicle control apparatus, and details are not described in this embodiment again.

The sequence numbers of the foregoing embodiments of the presently disclosed technology are merely for description but do not indicate the preference of the embodiments.

When being implemented in the form of a software functional unit and sold or used as an independent product, the integrated unit in the foregoing embodiments may be stored in the foregoing computer-readable storage medium. Based on such an understanding, the technical solutions in the presently disclosed technology essentially, or the part contributing to the existing technology, or all or some of the technical solutions may be implemented in a form of a software product. The computer software product is stored in a storage medium, and includes several instructions for instructing one or more computer devices (which may be a personal computer, a server, a network device, or the like) to perform all or some of the steps of the methods in the embodiments of the presently disclosed technology.

In the foregoing embodiments of the presently disclosed technology, the description of each embodiment has respective focuses, and for the part that is not described in detail in an embodiment, refer to the relevant description of other embodiments.

In the several embodiments provided in the presently disclosed technology, it should be understood that the disclosed client may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the presently disclosed technology may be integrated into one processing unit, or each of the units may exist alone physically, or two or more units are integrated into one unit. The integrated unit may be implemented in a form of hardware, or may be implemented in a form of a software functional unit.

The foregoing descriptions are merely preferred implementations of the presently disclosed technology. It should be noted that a person of ordinary skill in the art may make improvements and polishing without departing from the principle of the presently disclosed technology, and these all shall fall within the protection scope of the presently disclosed technology.

What is claimed is:

1. A method, comprising:
   at a device having one or more processors, memory, a display generation component, and a touch-sensitive input surface:
      displaying a map using the display generation component;
      while displaying the map using the display generation component, detecting a first touch input on the touch-sensitive surface, including detecting first movement of a first contact across the touch-sensitive surface to form a first movement path on the touch-sensitive surface;
      in response to detecting the first movement of the first contact across the touch-sensitive surface to form the first movement path on the touch-sensitive surface:
         overlaying a trajectory on the map in accordance with the first movement path formed on the touch-sensitive surface;
         automatically identifying a plurality of discrete points on the first movement path;
         selecting a subset of the plurality of discrete points as a plurality of waypoints along the trajectory in accordance with a preset condition that an angle formed by two adjacent lines defined by each three consecutive waypoints of the plurality of waypoints with a middle one of the three consecutive waypoints being a vertex of the angle is less than a predetermined threshold; and
         displaying respective representations of the plurality of waypoints on the trajectory; and
      sending instructions to a respective unmanned vehicle in accordance with the trajectory and the plurality of waypoints, wherein the respective unmanned vehicle moves in accordance with trajectory by executing the instructions.

2. The method of claim 1, including:
   while displaying the plurality of waypoints along the trajectory, detecting an editing input directed to one or more of the plurality of waypoints; and
   in response to detecting the editing input, editing the one or more of the plurality of waypoints, including:
      moving at least a first waypoint of the plurality of waypoints; and
      adjusting the trajectory in accordance with movement of the at least the first waypoint of the plurality of waypoints.

3. The method of claim 2, wherein editing the one or more of the plurality of waypoints includes:
   deleting at least a second waypoint of the plurality of waypoints; and
   adjusting the trajectory in accordance with deletion of the at least the second waypoint of the plurality of waypoints.

4. The method of claim 2, wherein editing the one or more of the plurality of waypoints includes:
   splitting at least a third waypoint of the plurality of waypoints into the third waypoint and a fourth waypoint distinct from the plurality of waypoints; and
   moving the fourth waypoint in accordance with a drag input on the touch-sensitive surface; and
   adjusting the trajectory in accordance with a final location of the fourth waypoint that is distinct from the plurality of waypoints.

5. The method of claim 1, including:
   detecting a selection input directed to a respective waypoint currently displayed along the trajectory on the map, wherein the map and the trajectory are displayed with a first zoom level; and
   in response to detecting the selection input, displaying a portion of the map with a second zoom level greater than the first zoom level, wherein the portion of the map corresponds to a location of the respective waypoint that is selected by the selection input.

6. The method of claim 5, including:
   while displaying the portion of the map at the second zoom level, detecting a second touch input on the touch-sensitive surface, including detecting second movement of a second contact across the touch-sensitive surface to form a second movement path on the touch-sensitive surface; and
   in response to detecting the second movement of the second contact across the touch-sensitive surface to form the second movement path on the touch-sensitive surface, modifying a local portion of the trajectory corresponding to the portion of the map in accordance with the second movement path of the second contact.

7. The method of claim 6, wherein:
   the local portion of the trajectory is displayed within a three-dimensional space corresponding to a three-dimensional physical coordinates of the respective waypoint, and
   the local portion of the trajectory is displayed with a plurality of automatically generated adjustment handles for adjusting the local portion of the trajectory in the three-dimensional space in accordance with one or more editing inputs directed to the adjustment handles.

8. A device, comprising:
one or more processors;
a display generation component;
a touch-sensitive input surface; and
memory storing instructions, the instructions, when executed by the one or more processors, cause the processors to perform operations comprising:
displaying a map using the display generation component;
while displaying the map using the display generation component, detecting a first touch input on the touch-sensitive surface, including detecting first movement of a first contact across the touch-sensitive surface to form a first movement path on the touch-sensitive surface;
in response to detecting the first movement of the first contact across the touch-sensitive surface to form the first movement path on the touch-sensitive surface:
overlaying a trajectory on the map in accordance with the first movement path formed on the touch-sensitive surface;
automatically identifying a plurality of discrete points on the first movement path;
selecting a subset of the plurality of discrete points as a plurality of waypoints along the trajectory in accordance with a preset condition that an angle formed by two adjacent lines defined by each three consecutive waypoints of the plurality of waypoints with a middle one of the three consecutive waypoints being a vertex of the angle is less than a predetermined threshold; and
displaying respective representations of the plurality of waypoints on the trajectory; and
sending instructions to a respective unmanned vehicle in accordance with the trajectory and the plurality of waypoints, wherein the respective unmanned vehicle moves in accordance with trajectory by executing the instructions.

9. The device of claim 8, wherein the operations include:
while displaying the plurality of waypoints along the trajectory, detecting an editing input directed to one or more of the plurality of waypoints; and
in response to detecting the editing input, editing the one or more of the plurality of waypoints, including:
moving at least a first waypoint of the plurality of waypoints; and
adjusting the trajectory in accordance with movement of the at least the first waypoint of the plurality of waypoints.

10. The device of claim 9, wherein editing the one or more of the plurality of waypoints includes:
deleting at least a second waypoint of the plurality of waypoints; and
adjusting the trajectory in accordance with deletion of the at least the second waypoint of the plurality of waypoints.

11. The device of claim 9, wherein editing the one or more of the plurality of waypoints includes:
splitting at least a third waypoint of the plurality of waypoints into the third waypoint and a fourth waypoint distinct from the plurality of waypoints; and
moving the fourth waypoint in accordance with a drag input on the touch-sensitive surface; and
adjusting the trajectory in accordance with a final location of the fourth waypoint that is distinct from the plurality of waypoints.

12. The device of claim 8, wherein the operations include:
detecting a selection input directed to a respective waypoint currently displayed along the trajectory on the map, wherein the map and the trajectory are displayed with a first zoom level; and
in response to detecting the selection input, displaying a portion of the map with a second zoom level greater than the first zoom level, wherein the portion of the map corresponds to a location of the respective waypoint that is selected by the selection input.

13. The device of claim 12, wherein the operations include:
while displaying the portion of the map at the second zoom level, detecting a second touch input on the touch-sensitive surface, including detecting second movement of a second contact across the touch-sensitive surface to form a second movement path on the touch-sensitive surface; and
in response to detecting the second movement of the second contact across the touch-sensitive surface to form the second movement path on the touch-sensitive surface, modifying a local portion of the trajectory corresponding to the portion of the map in accordance with the second movement path of the second contact.

14. The device of claim 13, wherein:
the local portion of the trajectory is displayed within a three-dimensional space corresponding to a three-dimensional physical coordinates of the respective waypoint, and
the local portion of the trajectory is displayed with a plurality of automatically generated adjustment handles for adjusting the local portion of the trajectory in the three-dimensional space in accordance with one or more editing inputs directed to the adjustment handles.

15. A non-transitory computer-readable storage medium storing a plurality of instructions configured for execution by a computer server having one or more processors, the plurality of instructions causing the computer server to perform the following operations:
displaying a map using a display generation component;
while displaying the map using the display generation component, detecting a first touch input on a touch-sensitive surface, including detecting first movement of a first contact across the touch-sensitive surface to form a first movement path on the touch-sensitive surface;
in response to detecting the first movement of the first contact across the touch-sensitive surface to form the first movement path on the touch-sensitive surface:
overlaying a trajectory on the map in accordance with the first movement path formed on the touch-sensitive surface;
automatically identifying a plurality of discrete points on the first movement path;
selecting a subset of the plurality of discrete points as a plurality of waypoints along the trajectory in accordance with a preset condition that an angle formed by two adjacent lines defined by each three consecutive waypoints of the plurality of waypoints with a middle one of the three consecutive waypoints being a vertex of the angle is less than a predetermined threshold; and
displaying respective representations of the plurality of waypoints on the trajectory; and sending instructions to a respective unmanned vehicle in accordance with the trajectory and the plurality of waypoints, wherein the respective unmanned vehicle moves in accordance with trajectory by executing the instructions.

16. The non-transitory computer-readable storage medium of claim 15, wherein the operations include:
while displaying the plurality of waypoints along the trajectory, detecting an editing input directed to one or more of the plurality of; and
in response to detecting the editing input, editing the one or more of the plurality of waypoints, including:
moving at least a first waypoint of the plurality of waypoints; and
adjusting the trajectory in accordance with movement of the at least the first waypoint of the plurality of waypoints.

17. The non-transitory computer-readable storage medium of claim 16, wherein editing the one or more of the plurality of waypoints includes:
deleting at least a second waypoint of the plurality of waypoints; and
adjusting the trajectory in accordance with deletion of the at least the second waypoint of the plurality of waypoints.

18. The non-transitory computer-readable storage medium of claim 16, wherein editing the one or more of the plurality of waypoints includes:
splitting at least a third waypoint of the plurality of waypoints into the third waypoint and a fourth waypoint distinct from the plurality of waypoints; and
moving the fourth waypoint in accordance with a drag input on the touch-sensitive surface; and
adjusting the trajectory in accordance with a final location of the fourth waypoint that is distinct from the plurality of waypoints.

19. The non-transitory computer-readable storage medium of claim 15, wherein the operations include:
detecting a selection input directed to a respective waypoint currently displayed along the trajectory on the map, wherein the map and the trajectory are displayed with a first zoom level; and
in response to detecting the selection input, displaying a portion of the map with a second zoom level greater than the first zoom level, wherein the portion of the map corresponds to a location of the respective waypoint that is selected by the selection input.

20. The non-transitory computer-readable storage medium of claim 19, wherein the operations include:
while displaying the portion of the map at the second zoom level, detecting a second touch input on the touch-sensitive surface, including detecting second movement of a second contact across the touch-sensitive surface to form a second movement path on the touch-sensitive surface; and
in response to detecting the second movement of the second contact across the touch-sensitive surface to form the second movement path on the touch-sensitive surface, modifying a local portion of the trajectory corresponding to the portion of the map in accordance with the second movement path of the second contact.

* * * * *